United States Patent
Fujii et al.

(10) Patent No.: US 8,098,352 B2
(45) Date of Patent: Jan. 17, 2012

(54) OPTICAL PICKUP APPARATUS AND LIQUID CRYSTAL OPTICAL ELEMENT

(75) Inventors: Naoki Fujii, Tokyo (JP); Shuji Naka, Fuchu (JP); Yoshiharu Takane, Iruma (JP)

(73) Assignee: Citizen Holdings Co., Ltd., Tokyo (JP)

( * ) Notice: Subject to any disclaimer, the term of this patent is extended or adjusted under 35 U.S.C. 154(b) by 954 days.

(21) Appl. No.: 11/713,686

(22) Filed: Mar. 5, 2007

(65) Prior Publication Data

US 2007/0211185 A1 Sep. 13, 2007

(30) Foreign Application Priority Data

Mar. 7, 2006 (JP) .................................. 2006-61008

(51) Int. Cl.
*G02F 1/133* (2006.01)
*G02F 1/1335* (2006.01)
*G02F 1/1343* (2006.01)

(52) U.S. Cl. ............ 349/117; 349/19; 349/99; 349/102; 349/139

(58) Field of Classification Search .................... 349/19, 349/96, 99, 102, 117, 118, 121, 139
See application file for complete search history.

(56) References Cited

U.S. PATENT DOCUMENTS

| 2005/0157224 A1* | 7/2005 | Kanbe et al. ................ 349/96 |
| 2005/0174504 A1* | 8/2005 | Hashimoto ................ 349/54 |
| 2006/0050215 A1* | 3/2006 | Haruyama .................. 349/117 |
| 2006/0285038 A1* | 12/2006 | Uchida et al. .............. 349/117 |
| 2009/0167965 A1* | 7/2009 | Naka et al. .................. 349/1 |

FOREIGN PATENT DOCUMENTS

| JP | 10-074336 | 3/1998 |
| JP | 11-096574 | 4/1999 |
| JP | 2001-034996 | * 2/2001 ............... 369/112.02 |
| JP | 3142251 B | 3/2001 |
| JP | 2005-141839 | 6/2005 |

* cited by examiner

*Primary Examiner* — Mark Robinson
*Assistant Examiner* — Jerry Blevins
(74) *Attorney, Agent, or Firm* — Finnegan, Henderson, Farabow, Garrett & Dunner, L.L.P.

(57) ABSTRACT

The present invention is directed to the provision of an optical pickup apparatus in which a liquid crystal optical element constructed by combining an aberration correcting liquid crystal panel and a λ/4 liquid crystal panel in an integral fashion is mounted in a tilted position. More particularly, the invention provides a liquid crystal optical element comprising a first liquid crystal layer for correcting aberration, a second liquid crystal layer functioning as an nλ/4 plate and combined in an integral fashion with the first liquid crystal layer, a transparent electrode for generating a potential difference on the second liquid crystal layer in order to control an amount of phase difference for the light beam passing through the second liquid crystal layer, and a driver for driving the transparent electrode so as to generate a potential difference that is the lowest among a plurality of potential differences that cause the second liquid crystal layer to function as an nλ/4 plate. The invention also provides an optical pickup apparatus incorporating such a liquid crystal optical element.

20 Claims, 21 Drawing Sheets

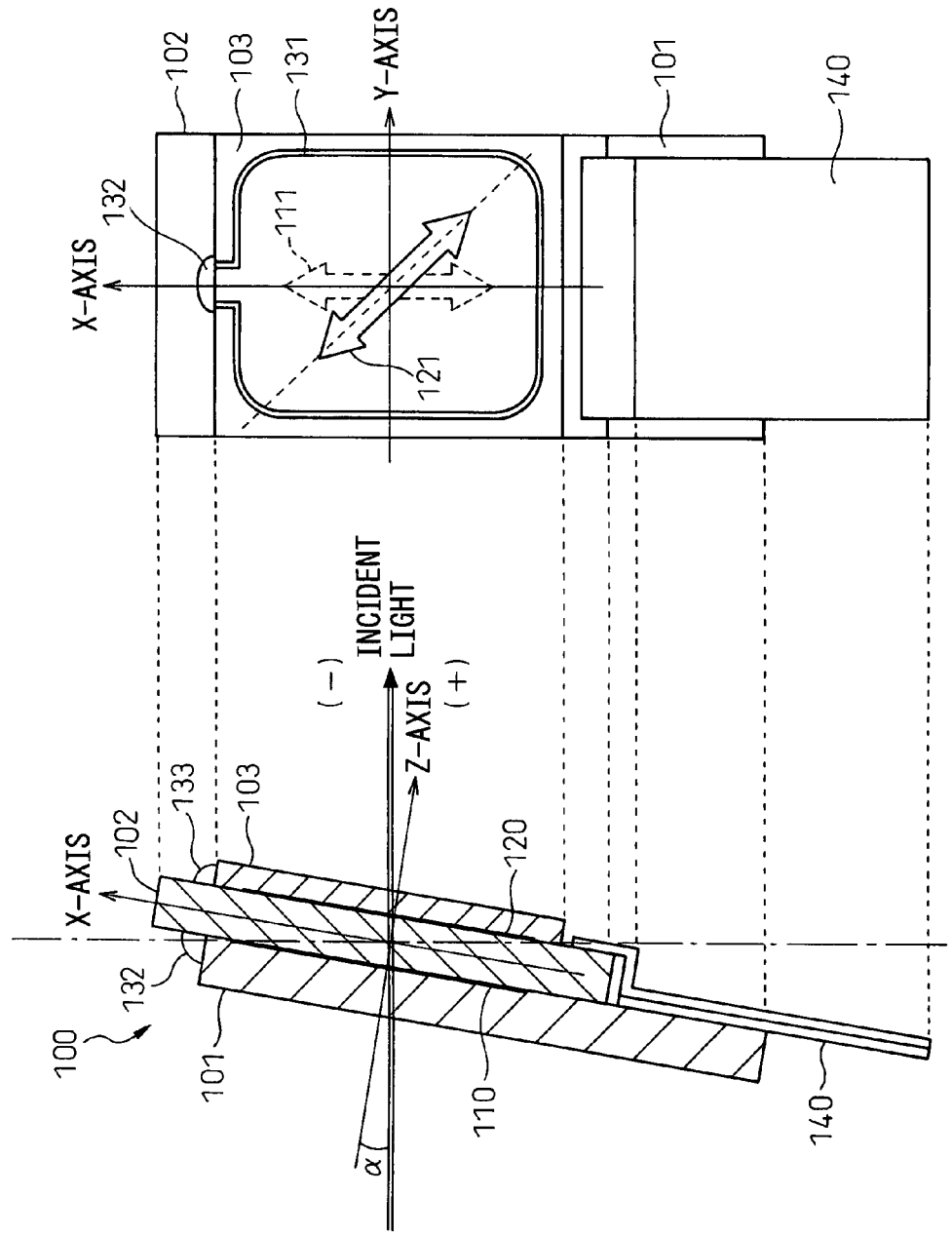

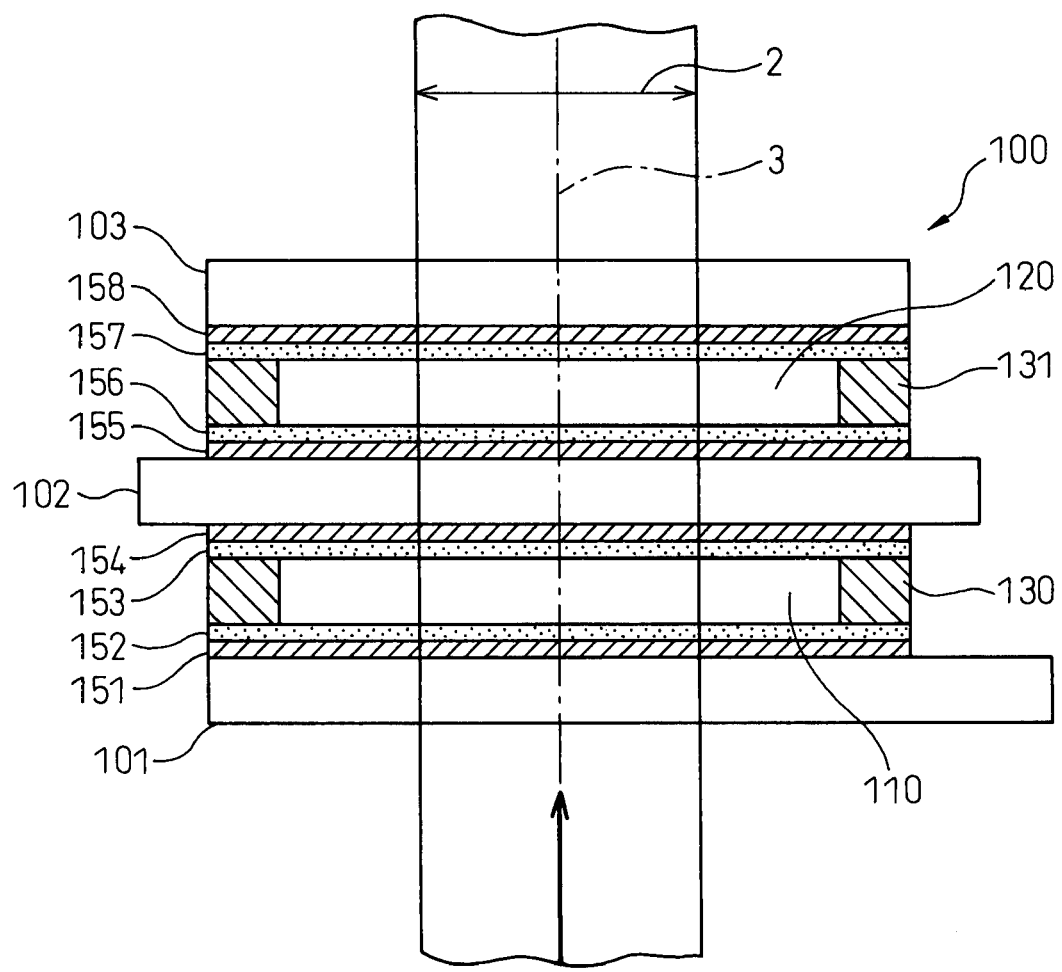

3λ/4 PLATE (HOMOGENEOUS ALIGNMENT, 650nm, 6.0 μm)

5λ/4 PLATE (HOMOGENEOUS ALIGNMENT, 650nm, 6.0 μm)

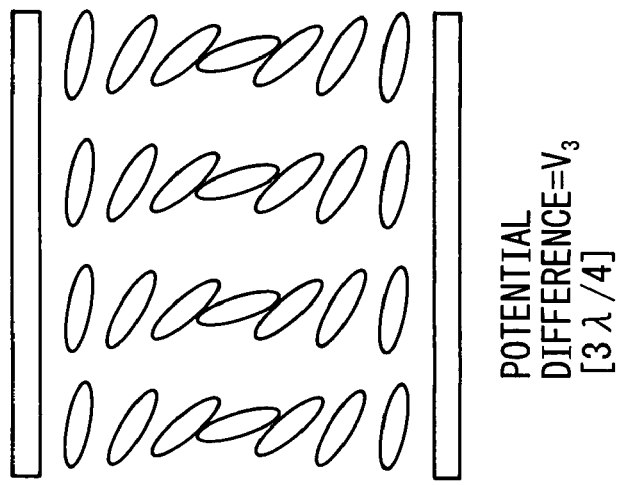
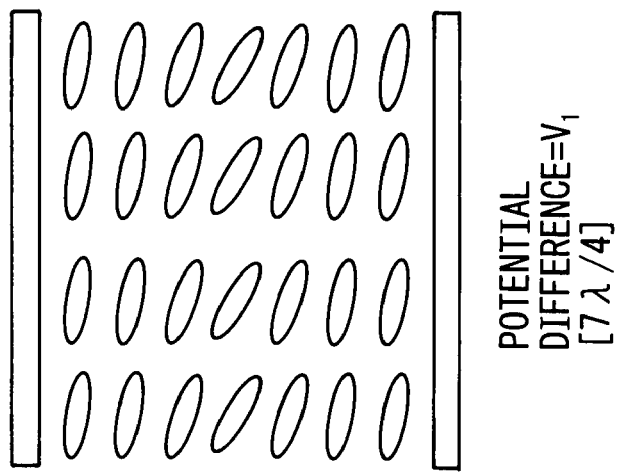
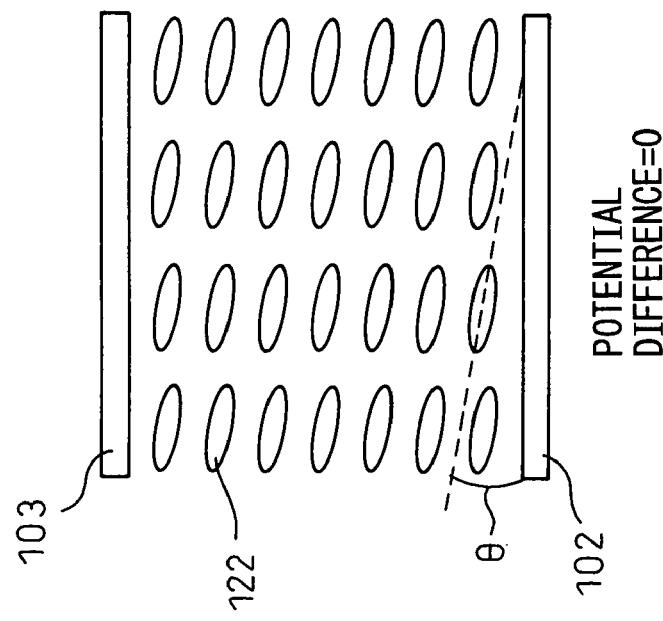

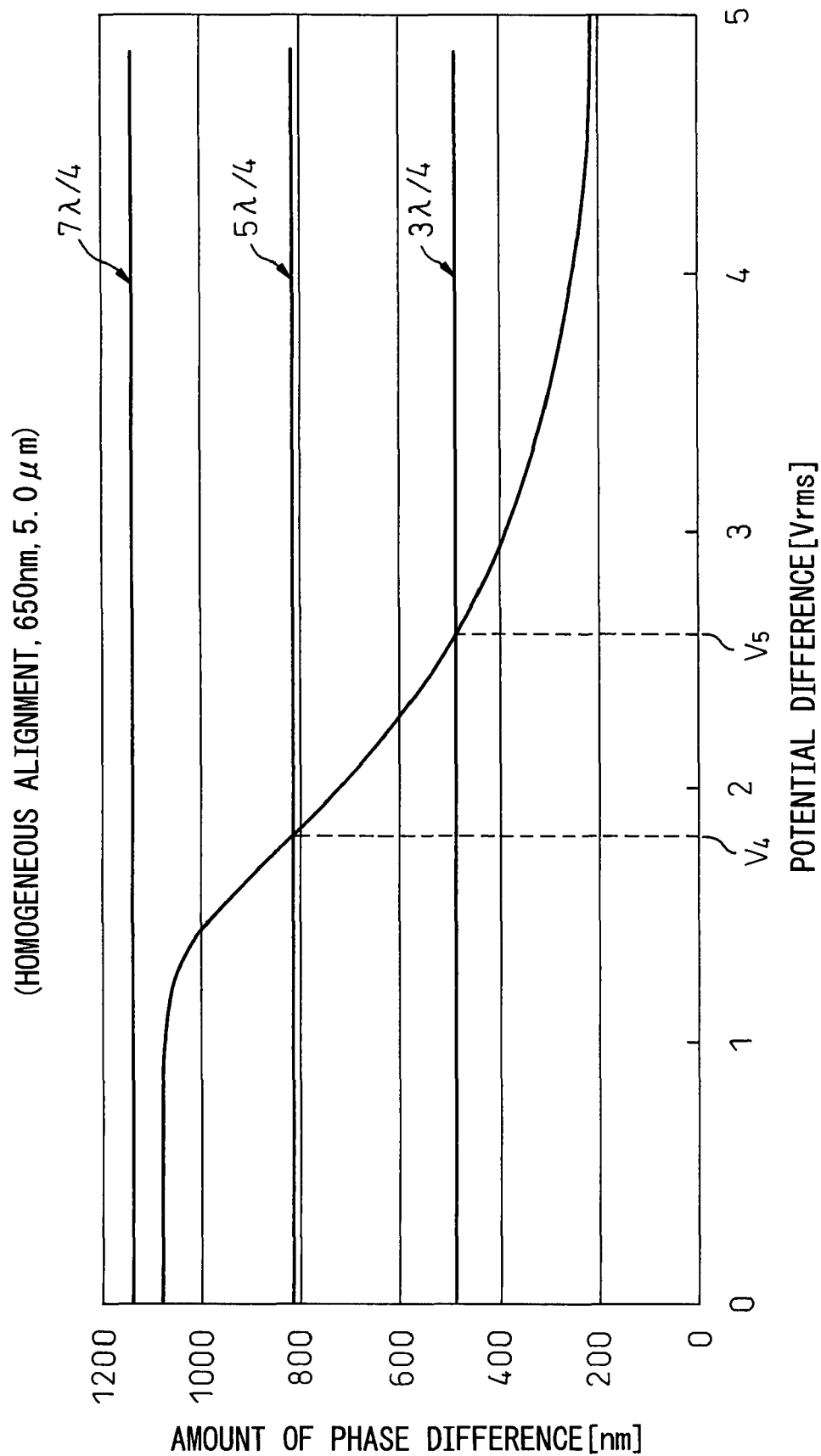

3λ/4 PLATE (HOMOGENEOUS ALIGNMENT, 650nm, 5.0μm)

5λ/4 PLATE (HOMOGENEOUS ALIGNMENT, 650nm, 5.0μm)

3λ/4 PLATE (HOMOGENEOUS ALIGNMENT, 780nm, 5.0μm)

5λ/4 PLATE (HOMOGENEOUS ALIGNMENT, 780nm, 5.0μm)

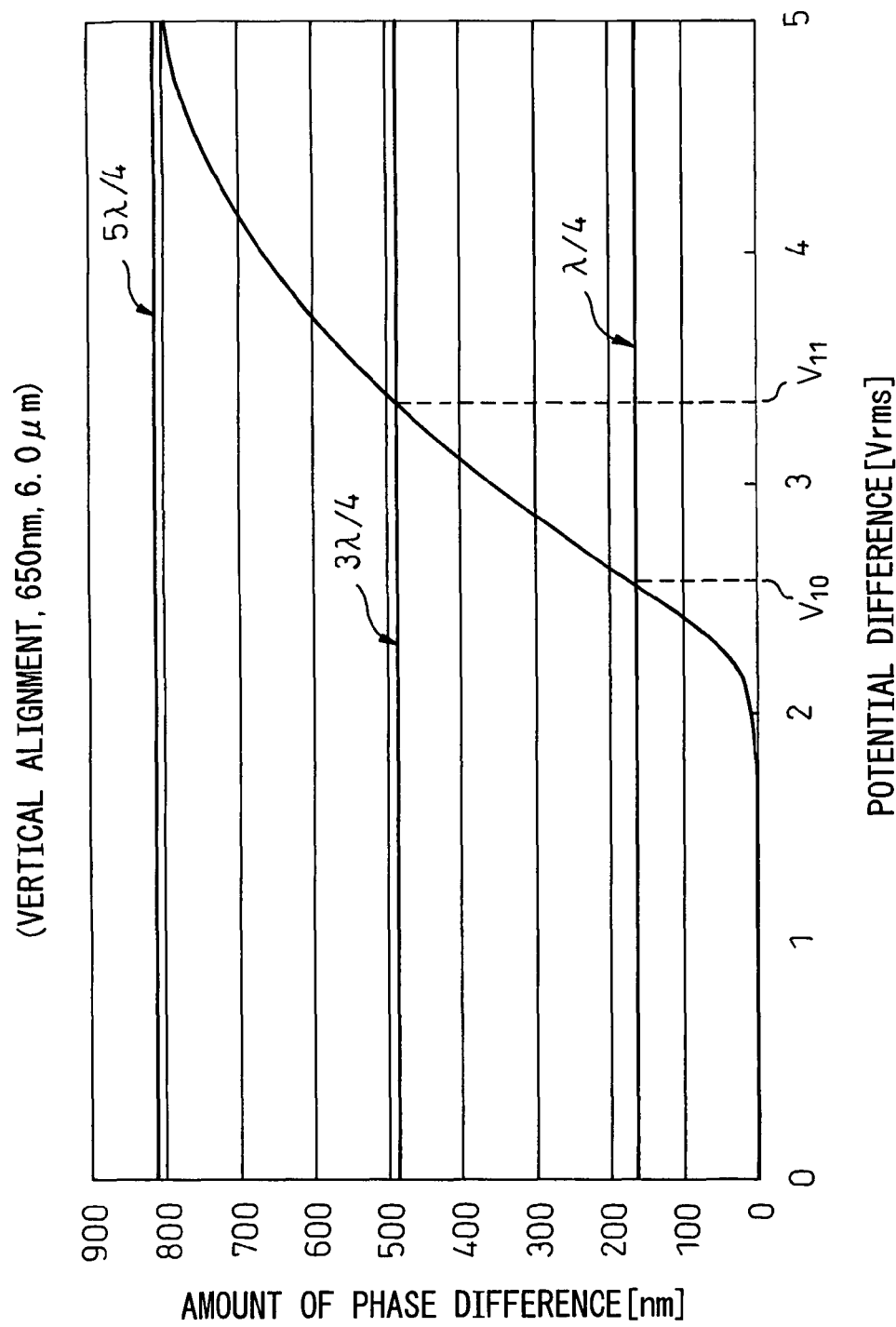

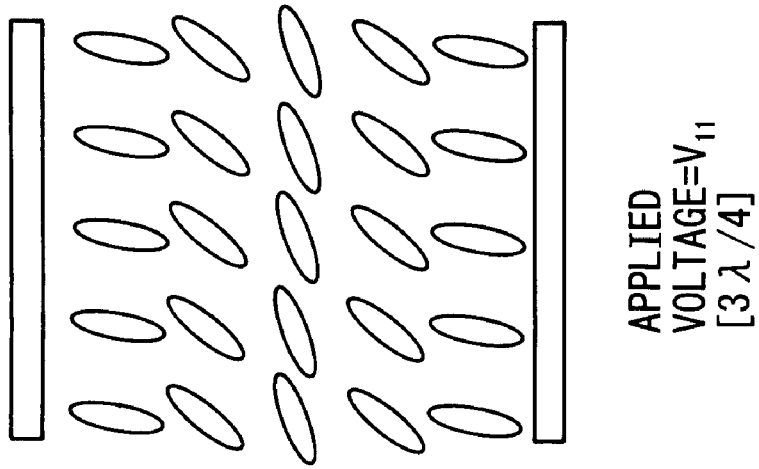
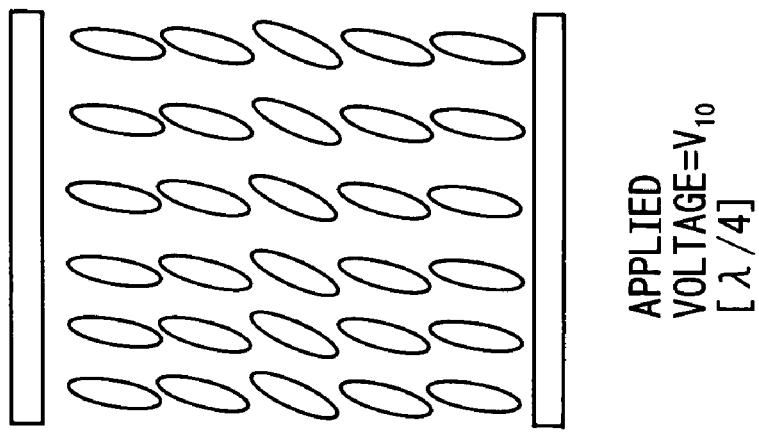
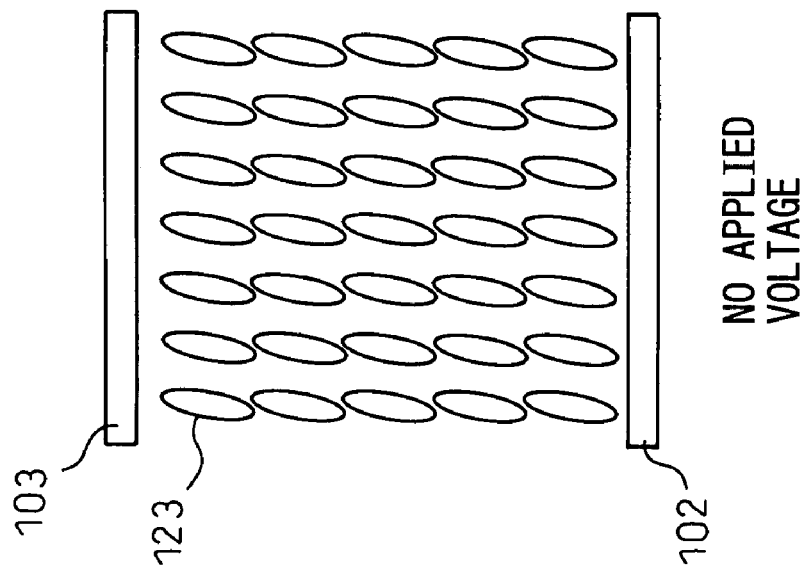

Fig.23(a)
Fig.23(b)
Fig.23(c)
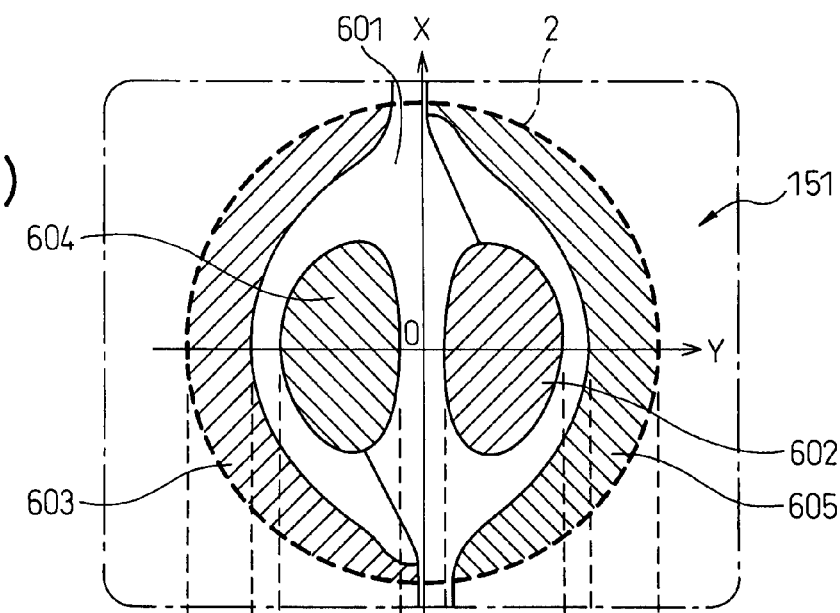
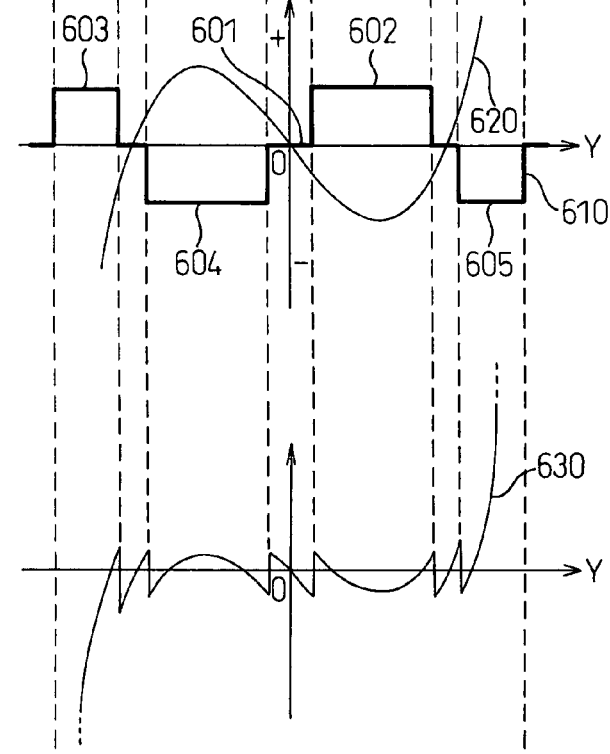

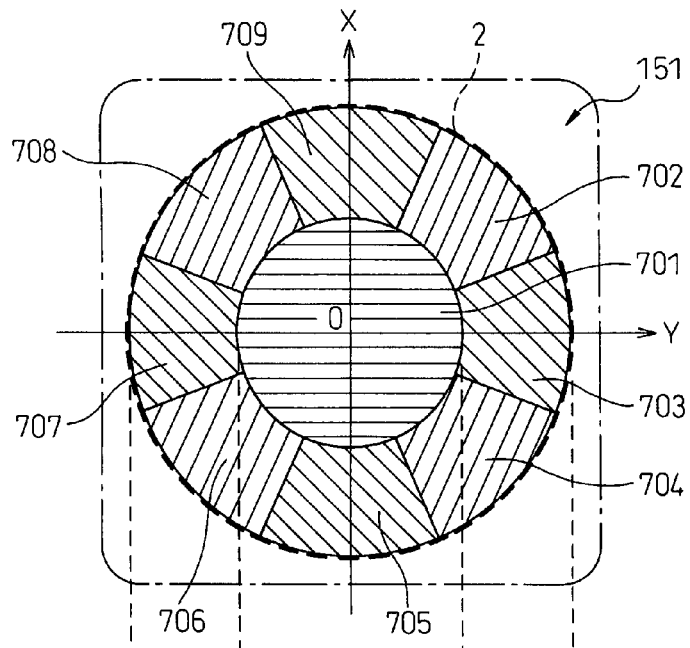
Fig.24(a)
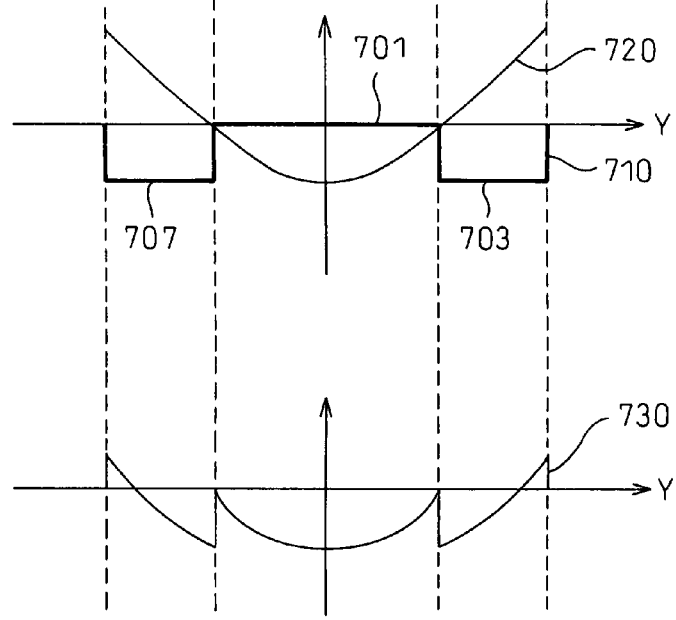
Fig.24(b)
Fig.24(c)

OPTICAL PICKUP APPARATUS AND LIQUID CRYSTAL OPTICAL ELEMENT

The Applicant claims the right to priority based on Japanese Patent Applications JP 2006-61008, filed on Mar. 7, 2006, and the entire content of JP 2006-61008 is hereby incorporated by reference.

FIELD OF THE INVENTION

The present invention relates to an optical pickup apparatus and a liquid crystal optical element and, more particularly, to a liquid crystal optical element having an aberration correction function as well as the function of an $n\lambda/4$ plate, and an optical pickup apparatus incorporating such a liquid crystal optical element.

BACKGROUND OF THE INVENTION

For a liquid crystal panel that functions as a quarter-wave plate, it is known to provide a configuration in which the liquid crystal panel is tilted with respect to the optical axis by an angle equal to the angle (pretilt angle) that the long axis direction of liquid crystal molecules makes with the glass substrate (for example, refer to patent document 1). By tilting the liquid crystal panel in this manner, the long axis direction of the liquid crystal molecules can be oriented at right angles to the optical axis, and the liquid crystal panel can thus be made to function as a perfect quarter-wave plate.

It is also known to provide a configuration in which two liquid crystal layers are formed using three glass substrates, one liquid crystal layer being formed as an aberration correcting layer and the other as a quarter-wave plate, and the liquid crystal panel with its rubbing direction oriented at an angle of 45 degrees relative to the rubbing direction of the aberration correcting liquid crystal layer is placed perpendicular to the optical axis (refer, for example, to patent document 2).

Patent document 1: Japanese Patent Publication No. 3142251 (page 3 and FIG. 2)

Patent document 2: Japanese Unexamined Patent Publication No. 2001-34996 (page 29 and FIG. 21).

SUMMARY OF THE INVENTION

If the aberration correcting liquid crystal panel is placed perpendicular to the optical axis, there arises the problem that the light emitted from the light source is reflected by the liquid crystal panel back toward the light source, causing light rays to interfere with each other and resulting in the generation of noise and, hence, an inability to obtain light of stable intensity from the light source. Accordingly, the aberration correcting liquid crystal panel must be tilted at a certain angle with respect to the optical axis. Further, when tilting the aberration correcting liquid crystal panel, it must be tilted in a direction perpendicular to its rubbing direction (the long axis direction of the liquid crystal molecules). If it is not tilted in such a direction, the aberration correcting liquid crystal panel will rotate the direction of polarization of the incident light, and thus the aberration correcting liquid crystal panel will become unable to perform its intended function for the light contained in the effective light beam.

On the other hand, in the $\lambda/4$ liquid crystal panel, a pretilt angle is provided between the long axis direction of the liquid crystal molecules and the direction parallel to the transparent glass substrate. Accordingly, if the $\lambda/4$ liquid crystal panel is not used by tilting it so as to reduce the pretilt angle to zero, there arises the problem that, because of its incidence angle dependence, the liquid crystal panel does not function as an accurate $\lambda/4$ plate.

Here, consider a liquid crystal optical element constructed by combining in an integral fashion the aberration correcting liquid crystal panel and the $\lambda/4$ liquid crystal panel whose rubbing direction is oriented at 45 degrees relative to the rubbing direction of the aberration correcting liquid crystal panel; when this liquid crystal optical element is tilted, naturally both the aberration correcting liquid crystal panel and the $\lambda/4$ liquid crystal panel tilt in the same direction. However, the rubbing direction of the aberration correcting liquid crystal panel and the direction that reduces the pretilt angle of the $\lambda/4$ liquid crystal panel to zero cannot be the same. As a result, the liquid crystal optical element constructed by combining the aberration correcting liquid crystal panel and the $\lambda/4$ liquid crystal panel in an integral fashion cannot be used in a tilted position in an optical pickup apparatus.

Accordingly, it is an object of the present invention to provide a liquid crystal optical element and an optical pickup apparatus that can resolve the above problem.

It is also an object of the present invention to provide an optical pickup apparatus in which a liquid crystal optical element constructed by combining an aberration correcting liquid crystal panel and a $\lambda/4$ liquid crystal panel in an integral fashion is mounted in a tilted position.

An optical pickup apparatus according to the present invention includes a light source for emitting a light beam, a liquid crystal optical element having a first liquid crystal layer for correcting aberration and a second liquid crystal layer functioning as an $n\lambda/4$ plate in an integral fashion and is disposed at an angle relative to the optical axis of the light beam, a transparent electrode for generating a potential difference on the second liquid crystal layer in order to control an amount of phase difference for the light beam passing through the second liquid crystal layer, an objective lens for focusing the light beam passed through the liquid crystal optical element, and a driver for driving the transparent electrode so as to generate a potential difference that is the lowest among a plurality of potential differences that cause the second liquid crystal layer to function as an $n\lambda/4$ plate.

An alternative optical pickup apparatus according to the present invention includes a light source for emitting a light beam, a liquid crystal optical element having a first liquid crystal layer for correcting aberration and a homogeneously aligned second liquid crystal layer functioning as an $n\lambda/4$ plate in an integral fashion and is disposed at an angle relative to the optical axis of the light beam, a transparent electrode for generating a potential difference on the second liquid crystal layer in order to control an amount of phase difference for the light beam passing through the second liquid crystal layer, an objective lens for focusing the light beam passed through the liquid crystal optical element, and a driver for driving the transparent electrode so as to generate a potential difference corresponding to the amount of phase difference that achieves the highest order n among a plurality of amounts of phase difference that cause the second liquid crystal layer to function as an $n\lambda/4$ plate.

A further alternative optical pickup apparatus according to the present invention includes a light source for emitting a light beam, a liquid crystal optical element having a first liquid crystal layer for correcting aberration and a vertically aligned second liquid crystal layer functioning as an $n\lambda/4$ plate in an integral fashion and is disposed at an angle relative to the optical axis of the light beam, a transparent electrode for generating a potential difference on the second liquid crystal layer in order to control an amount of phase difference for the light beam passing through the second liquid crystal layer, an objective lens for focusing the light beam passed through the liquid crystal optical element, and a driver for driving the transparent electrode so as to generate a potential difference corresponding to the amount of phase difference that achieves the lowest order n among a plurality of amounts of phase difference that cause the second liquid crystal layer to function as an nλ/4 plate.

A liquid crystal optical element according to the present invention includes a first liquid crystal layer for correcting aberration, a second liquid crystal layer functioning as an nλ/4 plate and combined in an integral fashion with the first liquid crystal layer, a transparent electrode for generating a potential difference on the second liquid crystal layer in order to control an amount of phase difference for the light beam passing through the second liquid crystal layer, and a driver for driving the transparent electrode so as to generate a potential difference that is the lowest among a plurality of potential differences that cause the second liquid crystal layer to function as an nλ/4 plate.

An alternative liquid crystal optical element according to the present invention includes a first liquid crystal layer for correcting aberration, a homogeneously aligned second liquid crystal layer functioning as an nλ/4 plate and combined in an integral fashion with the first liquid crystal layer, a transparent electrode for generating a potential difference on the second liquid crystal layer in order to control an amount of phase difference for the light beam passing through the second liquid crystal layer, and a driver for driving the transparent electrode so as to generate a potential difference corresponding to the amount of phase difference that achieves the highest order n among a plurality of amounts of phase difference that cause the second liquid crystal layer to function as an nλ/4 plate.

A further alternative liquid crystal optical element according to the present invention includes a first liquid crystal layer for correcting aberration, a vertically aligned second liquid crystal layer functioning as an nλ/4 plate and combined in an integral fashion with the first liquid crystal layer, a transparent electrode for generating a potential difference on the second liquid crystal layer in order to control an amount of phase difference for the light beam passing through the second liquid crystal layer, and a driver for driving the transparent electrode so as to generate a potential difference corresponding to the amount of phase difference that achieves the lowest order n among a plurality of amounts of phase difference that cause the second liquid crystal layer to function as an nλ/4 plate.

Preferably, in the optical pickup apparatus or the liquid crystal optical element according to the present invention, the angle that the rubbing direction of the first liquid crystal layer makes with the rubbing direction of the second liquid crystal layer is approximately 45 degrees and, further preferably, the liquid crystal optical element is tilted in a direction that matches the rubbing direction of the first liquid crystal layer. This is because, if the liquid crystal optical element was tilted in such a direction, the aberration correction capability of the aberration correcting first liquid crystal layer would be lost.

Preferably, in the optical pickup apparatus or the liquid crystal optical element according to the present invention, the first liquid crystal layer corrects coma, spherical aberration, or astigmatism.

Further preferably, in the optical pickup apparatus or the liquid crystal optical element according to the present invention, the first liquid crystal layer and the second liquid crystal layer are provided alternately between three transparent substrates.

According to the present invention, as the liquid crystal optical element is constructed by combining the aberration correcting liquid crystal panel and the nλ/4 liquid crystal panel in an integral fashion, the aberration correcting liquid crystal panel and the nλ/4 liquid crystal panel can be arranged in a single setup procedure.

Furthermore, according to the present invention, using the liquid crystal optical element constructed by combining the aberration correcting liquid crystal panel and the nλ/4 liquid crystal panel in an integral fashion, not only can reflections be prevented from occurring at the aberration correcting liquid crystal panel, but at the same time, the nλ/4 liquid crystal panel can be made to function as an accurate nλ/4 plate.

BRIEF DESCRIPTION OF THE DRAWINGS

These and other features and advantages of the present invention will be better understood by reading the following detailed description, taken together with the drawings wherein:

FIG. 2(a) is a cross-sectional view of the liquid crystal optical element 100, and FIG. 2(b) is a plan view of the liquid crystal optical element 100 as viewed from the light exit side;

FIG. 3 is a schematic cross-sectional view for explaining the structure of the liquid crystal optical element 100;

FIG. 11 is a diagram for explaining the behavior of a homogenously aligned liquid crystal layer in the presence of an applied potential difference;

FIG. 12 is a diagram showing the relationship between the amount of phase difference and the voltage applied to an alternative second liquid crystal layer 201 when the 650-nm light source was used;

FIG. 21 is a diagram showing the relationship between the amount of phase difference and the voltage applied to a further alternative second liquid crystal layer 211 when the 650-nm light source was used;

FIG. 22 is a diagram for explaining the behavior of a vertically aligned liquid crystal layer in the presence of an applied potential difference;

FIG. 23(a) is a diagram showing a coma correcting transparent electrode pattern formed as the first transparent electrode 151, FIG. 23(b) is a diagram showing an example of the voltage applied to the transparent electrode pattern of the first transparent electrode 151, and FIG. 23(c) is a diagram showing an example of coma as improved by the transparent electrode pattern of the first transparent electrode 151;

FIG. 24(a) is a diagram showing an astigmatism correcting transparent electrode pattern formed as the first transparent electrode 151, FIG. 24(b) is a diagram showing an example of the voltage applied in the Y-axis direction of the transparent electrode pattern of the first transparent electrode 151, and FIG. 24(c) is a diagram showing an example of astigmatism in the Y-axis direction as improved by the transparent electrode pattern of the first transparent electrode 151.

DETAILED DESCRIPTION OF THE PREFERRED EMBODIMENTS

An optical pickup unit and a liquid crystal optical element according to the present invention will be described below with reference to the drawings. It should, however, be noted that the present invention is not limited by the description given herein, but embraces the inventions described in the appended claims and their equivalents.

Figure 1:
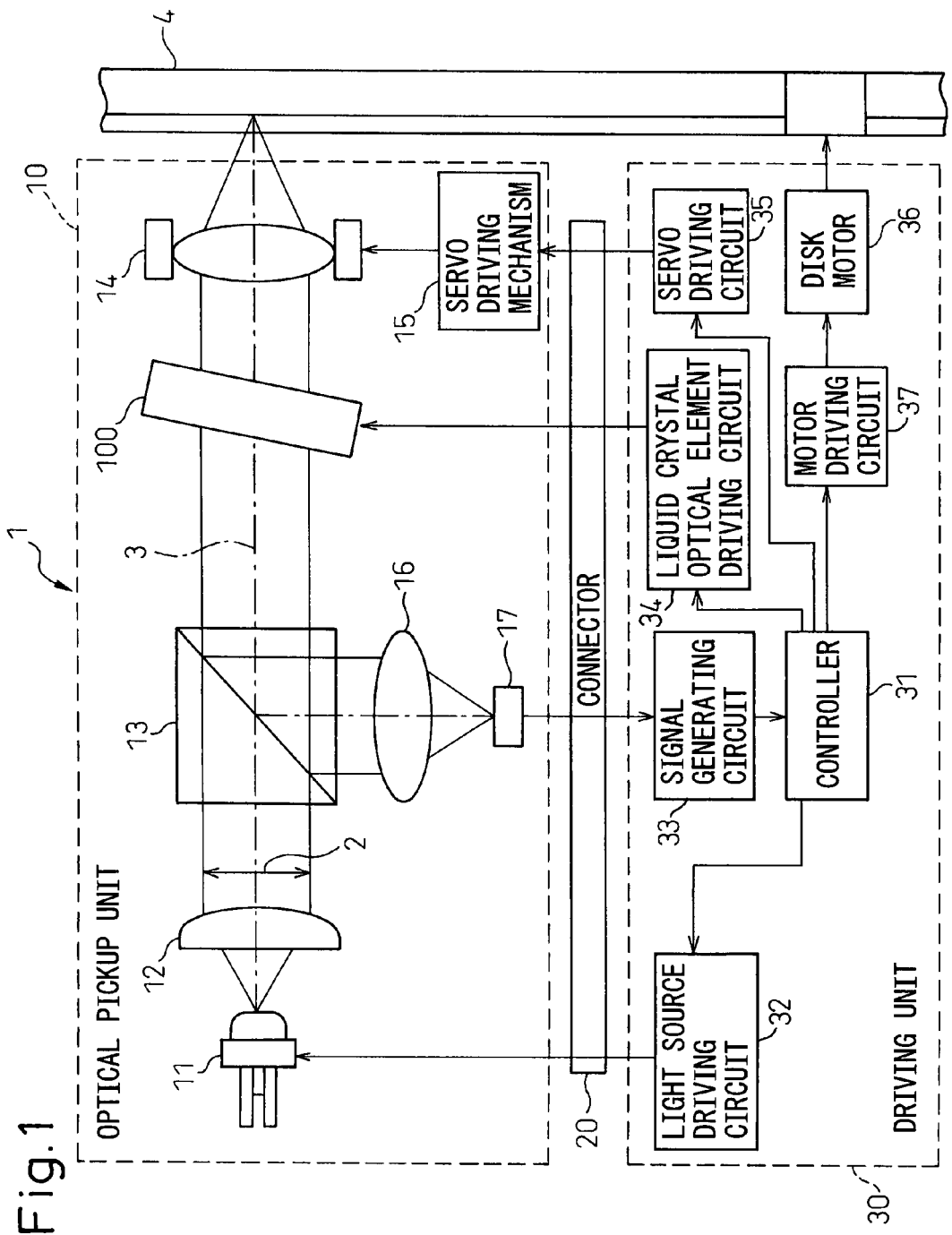
FIG. 1 is a schematic diagram showing the configuration of an optical apparatus 1 which includes an optical pickup apparatus and a liquid crystal optical element according to the present invention.

FIG. 1 is a schematic diagram showing the configuration of an optical apparatus 1 which includes an optical pickup apparatus and a liquid crystal optical element according to the present invention.

The optical apparatus 1, which comprises optical pickup apparatus 10, connector 20, and driving unit 30, is an apparatus for writing and reading data on a recording medium 4 such as a DVD or CD.

In the optical pickup apparatus 10, a light beam (650 nm) emitted from a light source 11 constructed from a semiconductor laser or the like is converted by a collimator lens 12 into a substantially parallel beam of light which passes through a polarization beam splitter 13 and enters the liquid crystal optical element 100. The light passed through the liquid crystal optical element 100 is focused by an objective lens 14 (numerical aperture NA=0.65) onto the track surface of the recording medium 4. As shown in FIG. 1, the light beam has an effective diameter 2 and an optical axis 3. The tracking motion of the objective lens 14 is performed by a servo mechanism 15 so that the spot focused by the objective lens 14 is accurately positioned on the track.

The light beam reflected from the track of the recording medium 4 again passes through the objective lens 14 and the liquid crystal optical element 100, and enters the polarization beam splitter 13 where the direction of the light beam is changed and the light beam is focused by a converging lens 16 onto a light detector 17. The light beam, when reflected at the recording medium 4, is amplitude-modulated by the information (pit) recorded on the track surface of the recording medium 4.

The driving unit 30 includes a light source driving circuit 32 for driving the light source 11, a signal generating circuit 33 which outputs a light intensity signal (RF) based on a light detection signal supplied from the light detector 17, a liquid crystal optical element driving circuit 34 for driving the liquid crystal optical element 100, a servo driving circuit 35 for driving the servo driving mechanism 15, a disk motor 36 for rotating the recording medium 4, a motor driving circuit 37 for driving the disk motor 36, and a controller 31, containing a RAM, ROM, CPU, etc., for controlling the entire operation.

The liquid crystal optical element 100, as will be described later, is constructed by combining, in an integral fashion, a first liquid crystal layer 110 that functions as an aberration correcting plate and a second liquid crystal layer 120 that functions as an nλ/4 plate, and is driven by a voltage applied from the liquid crystal optical element driving circuit 34. Here, the liquid crystal optical element driving circuit 34 may be incorporated in the liquid crystal optical element 100 to be described later.

Based on the light intensity signal generated by the signal generating circuit 33, the controller 31 reads information recorded on the recording medium 4 by rotating the recording medium 4 by means of the disk motor 36 while controlling the light source driving circuit 32 and the servo driving circuit 35.

Further, the controller 31 modulates the intensity of the light beam emitted from the light source 11 in accordance with a data signal to be written, and illuminates the recording medium 4 with the modulated light beam. On the track surface of the recording medium 4 to which the data is to be written, the refractive index or color of a thin film contained in the disk changes or a pit is formed in accordance with the intensity of the light beam, thus accomplishing the data write. The intensity modulation of the light beam is performed by the light source driving circuit 32 modulating the current to be supplied to the semiconductor laser device used as the light source 11.

The optical pickup apparatus 10 is connected to the driving unit 30 via the connector 20.

FIG. 2 is a diagram schematically showing the structure of the liquid crystal optical element 100.

FIG. 2(a) shows a cross-sectional view of the liquid crystal optical element 100, and FIG. 2(b) shows a plan view of the liquid crystal optical element 100 as viewed from the light exit side.

As shown in FIG. 2(a), the liquid crystal optical element 100 is constructed by stacking a first transparent substrate 101, a second transparent substrate 102, and a third transparent substrate 103 one on top of another. The liquid crystal optical element 100 further includes the first liquid crystal layer 110 as an aberration correcting plate, which is sandwiched between the first and second transparent substrates 101 and 102, and the second liquid crystal layer 120 as an nλ/4 plate, which is sandwiched between the second and third transparent substrates 102 and 103.

A flexible board 140 is connected to the first and second liquid crystal layers 110 and 120 so that prescribed voltages from the liquid crystal optical element driving circuit 34 are supplied to the respective individual liquid crystal layers.

The first liquid crystal layer 110 is sealed between the first and second transparent substrates 101 and 102 by means of a sealing member 130 and a stopping member 132. Likewise, the second liquid crystal layer 120 is sealed between the second and third transparent substrates 102 and 103 by means of a sealing member 131 and a stopping member 133.

As shown in FIG. 2(b), the angle that the rubbing direction 111 of the first liquid crystal layer 110 makes with the rubbing direction 121 of the second liquid crystal layer 120 is 45 degrees. This is because, if the prescribed linearly polarized light passed through the polarization beam splitter 13 is to be converted to nearly perfect circularly polarized light by the second liquid crystal layer 120 functioning as the nλ/4 plate, the rubbing direction 111 of the first liquid crystal layer 110 and the rubbing direction 121 of the second liquid crystal layer 120 must be oriented at 45 degrees to each other. X-axis, Y-axis, and Z-axis are set in relation to the liquid crystal optical element 100, as shown in FIG. 2. Here, the Z-axis indicates the direction perpendicular to the upper surface of the first transparent substrate 101. In the optical pickup apparatus of the present invention, the liquid crystal optical element 100 is tilted at an angle α with respect to the optical axis 3 (which coincides with the direction of the incident light) in order to prevent the light beam emitted from the light source 11 from being reflected by the liquid crystal optical element 100 back toward the light source 11. For convenience, the direction that the Z-axis is tilted downwardly of the optical axis in FIG. 2(a) is taken as (+), and the direction that the Z-axis is tilted upwardly of the optical axis in FIG. 2(a) is taken as (−).

When tilting the first liquid crystal layer 110 that functions as the aberration correcting plate, if the liquid crystal layer is not tilted in a direction perpendicular to its rubbing direction 111, the linearly polarized light entering the aberration correcting liquid crystal panel will emerge from it as elliptically polarized light. Accordingly, in the present embodiment, when the rubbing direction 111 of the first liquid crystal layer 110 is parallel to the X-axis, the liquid crystal optical element 100 is tilted by the angle α in such a manner as to turn the X-axis about the Y-axis toward the right in the figure. Preferably, the angle α is approximately equal to the pretilt angle of the first liquid crystal layer 110, i.e., about 3 degrees, for example, and its direction is the direction that cancels the pretilt angle of the first liquid crystal layer 110. That is, the angle that the Z-axis makes with the optical axis 3 parallel to the incident light is α. In the case of FIG. 2(a), the liquid crystal optical element 100 is tilted to the right in the figure, but alternatively, it may be tilted to the left in FIG. 2(a). For convenience, the angle by which the liquid crystal optical element 100 is tilted to the right in FIG. 2(a) is taken as (+), and the angle by which the liquid crystal optical element 100 is tilted to the left in FIG. 2(a) is taken as (−).

FIG. 3 is a schematic cross-sectional view for explaining the structure of the liquid crystal optical element 100.

In FIG. 3, an arrow indicates the direction of the light beam emitted from the light source 11. For convenience of explanation, the thicknesses of the respective elements are exaggerated, and their ratio does not represent the actual thickness ratio.

A first transparent electrode 151 and a first alignment film 152 are formed on the surface of the first transparent substrate 101 that faces the second transparent substrate 102. A first transparent counter electrode 154 and a second alignment film 153 are formed on the surface of the second transparent substrate 102 that faces the first transparent substrate 101. As earlier described, the first liquid crystal layer 110 is sealed between the first and second transparent substrates 101 and 102 by means of the sealing member 130, etc.

A second transparent counter electrode 155 and a third alignment film 156 are formed on the surface of the second transparent substrate 102 that faces the third transparent substrate 103. A second transparent electrode 158 and a fourth alignment film 157 are formed on the surface of the third transparent substrate 103 that faces the second transparent substrate 102. As earlier described, the second liquid crystal layer 120 is sealed between the second and third transparent substrates 102 and 103 by means of the sealing member 131, etc.

The first and second liquid crystal layers 110 and 120 are formed from the same liquid crystal and to the same thickness in view of mass-producibility. Further, the first and second liquid crystal layers 110 and 120 are homogeneously aligned (horizontally aligned) liquid crystal layers. The liquid crystal material used for the first and second liquid crystal layers 110 and 120 is a positive nematic liquid crystal with a Δn of 0.21 and a relative permittivity of 6.9; the layer thickness is 6.0 µm. For the first liquid crystal layer 110 to provide a sufficient amount of phase difference, it is preferable that the refractive index of the liquid crystal material be 0.15 or higher; the higher the refractive index, the better the performance, but a refractive index of 0.3 or less is preferable. This is because a prescribed total amount of phase difference is needed in order for the liquid crystal layers to function as the aberration correcting and nλ/4 plates. Further, if the first and second liquid crystal layers 110 and 120 are made too thin, there arises a manufacturing problem, and if they are made too thick, the response speed of the liquid crystal decreases; therefore, it is preferable that the first and second liquid crystal layers 110 and 120 be made not thinner than 3 µm but not thicker than 7 µm.

In FIGS. 2 and 3, the liquid crystal optical element 100 is constructed by sandwiching the two liquid crystal layers alternately between the three transparent glass substrates. Alternatively, the liquid crystal optical element 100 may be constructed by forming the liquid crystal layers each between two transparent glass substrates and by bonding them together using an adhesive or the like.

FIG. 4 is a diagram showing the relationship between the rubbing direction of each liquid crystal layer and the tilt of the liquid crystal optical element.

Figure 4A:
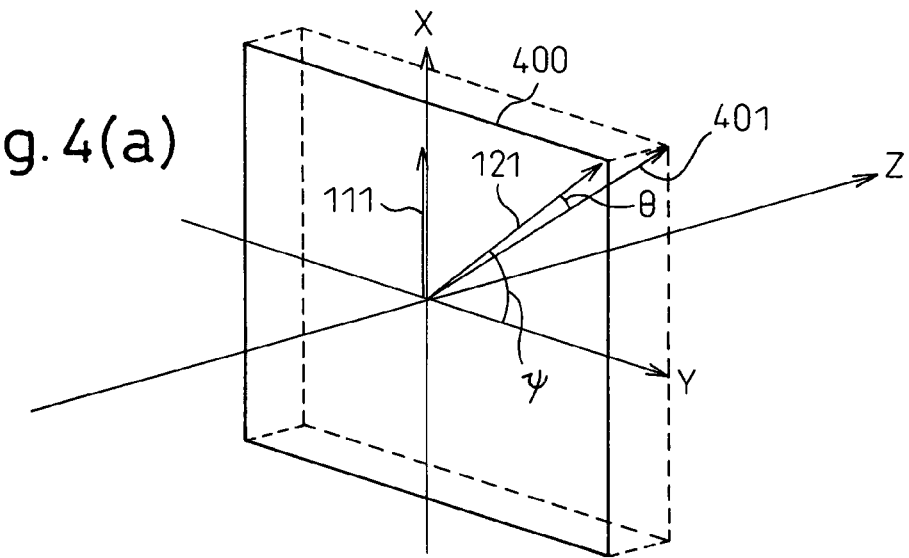
FIG. 4(a) is a diagram showing an arrangement in which the Z-axis of the liquid crystal optical element 100 is oriented parallel to the optical axis (the optical element is not tilted)
Figure 4B:
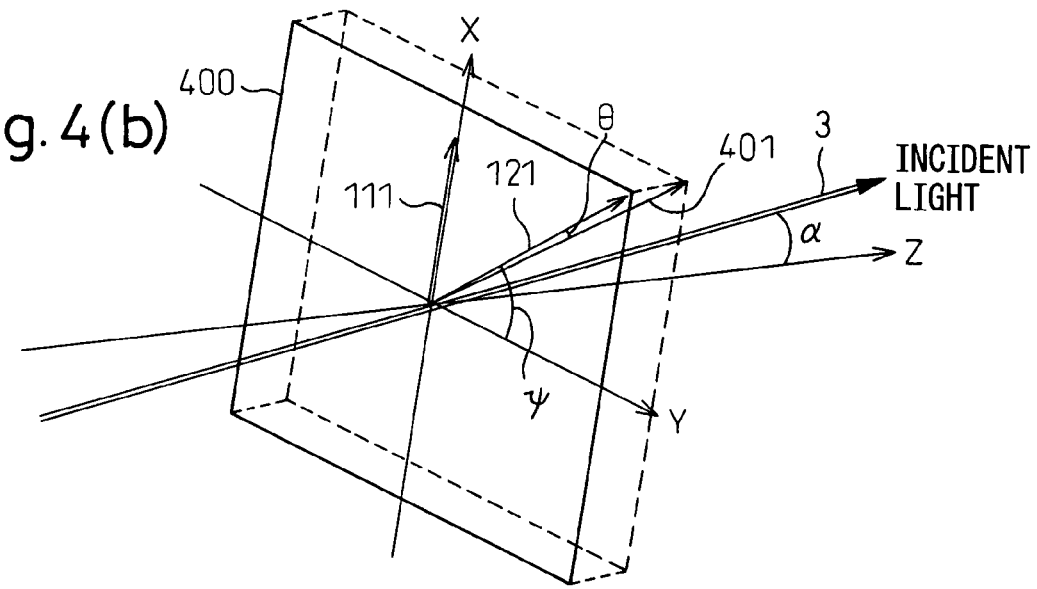
FIG. 4(b) is a diagram showing an arrangement in which the liquid crystal optical element 100 is tilted by an angle a as shown in FIG. 2.

FIG. 4(a) shows an arrangement in which the Z-axis of the liquid crystal optical element 100 is oriented parallel to the optical axis (the optical element is not tilted), and FIG. 4(b) shows an arrangement in which the liquid crystal optical element 100 is tilted by the angle α as previously shown in FIG. 2.

In FIG. 4(a), reference numeral 400 indicates the X-Y plane, and 401 the long axis direction of the liquid crystal molecules in the second liquid crystal layer 120 that functions as the nλ/4 plate. More specifically, the angle θ indicates the pretilt angle of the second liquid crystal layer 120, and the angle Ψ designates the angle (45 degrees) that the rubbing direction 121 of the second liquid crystal layer 120 makes with the rubbing direction 111 of the first liquid crystal layer 110.

When the liquid crystal optical element 100 is tilted by the angle α, the pretilt angle θ of the second liquid crystal layer 120, relative to the optical axis 3, is as shown in FIG. 4(b).

FIG. 5 is a diagram for explaining one example of the electrode pattern of the first transparent electrode and its function.

Figure 5A:
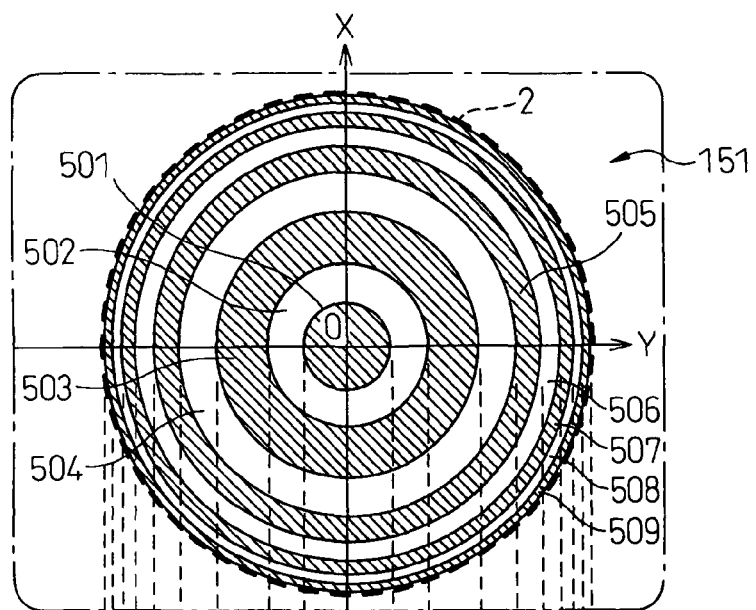
FIG. 5(a) is a diagram showing a spherical aberration correcting transparent electrode pattern formed as a first transparent electrode 151.
Figure 5B:
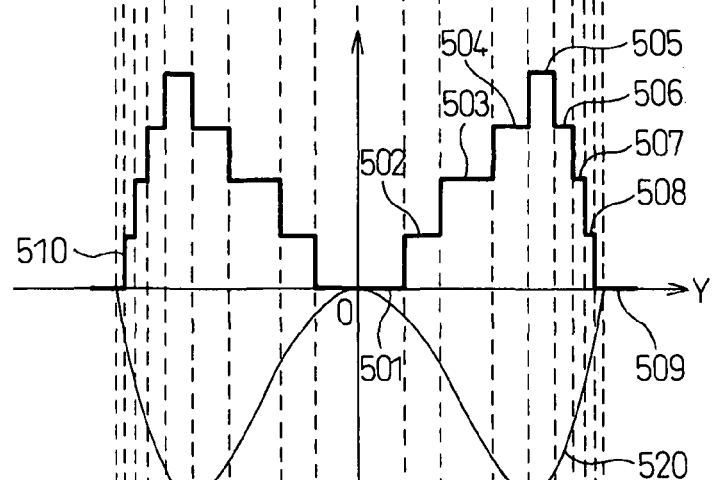
FIG. 5(b) is a diagram showing an example of the voltage applied to the transparent electrode pattern of the first transparent electrode 151.
Figure 5C:
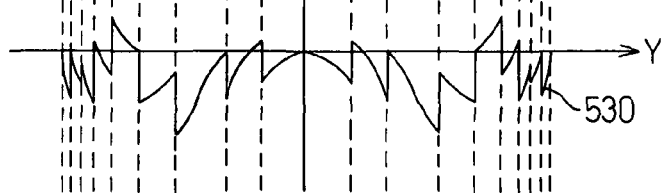
FIG. 5(c) is a diagram showing an example of spherical aberration as improved by the transparent electrode pattern of the first transparent electrode 151.

FIG. 5(a) shows a spherical aberration correcting transparent electrode pattern formed as the first transparent electrode 151, FIG. 5(b) shows an example of the voltage applied to the transparent electrode pattern of the first transparent electrode 151, and FIG. 5(c) shows an example of spherical aberration as improved by the transparent electrode pattern of the first transparent electrode 151.

There are cases where, due to imperfections such as irregularities in the thickness of the optically transmissive protective layer on the track surface of the recording medium 4, the distance between the objective lens 14 and the track surface varies or the light spot cannot be always focused in the same condition. Such variations in the distance between the objective lens 14 and the track surface cause spherical aberration in the substrate of the recording medium 4, leading to a degradation of the light intensity signal which is generated based on the reflected beam from the recording medium 4. One example of the spherical aberration measured at the position of the entrance pupil of the objective lens 14 is shown by 520 in FIG. 5(b).

In FIG. 5(a), nine concentric electrode patterns 501 to 509 are formed within the range of the effective diameter 2. Voltage 510 such as shown in FIG. 5(b) is applied to each region. When the voltage 510 such as shown in FIG. 5(b) is applied to the transparent electrode pattern of the first transparent electrode 151 such as shown in FIG. 5(a), a potential difference occurs with respect to the first transparent counter electrode 154, and the alignment of the liquid crystal between them changes according to the potential difference. As a result, the light beam passing through this portion experiences an effect that advances its phase according to the potential difference. With this effect, the spherical aberration 520 occurring in the substrate of the recording medium 4 is corrected as shown by the spherical aberration 530 in FIG. 5(c). Here, the voltage to be applied to the transparent electrode pattern of the first transparent electrode 151 is supplied via the flexible board 140.

In the present embodiment, the first liquid crystal layer 110 has been constructed to correct spherical aberration but, for aberrations other than spherical aberration, it can be constructed to correct coma or astigmatism, as will be described later.

Figure 6:
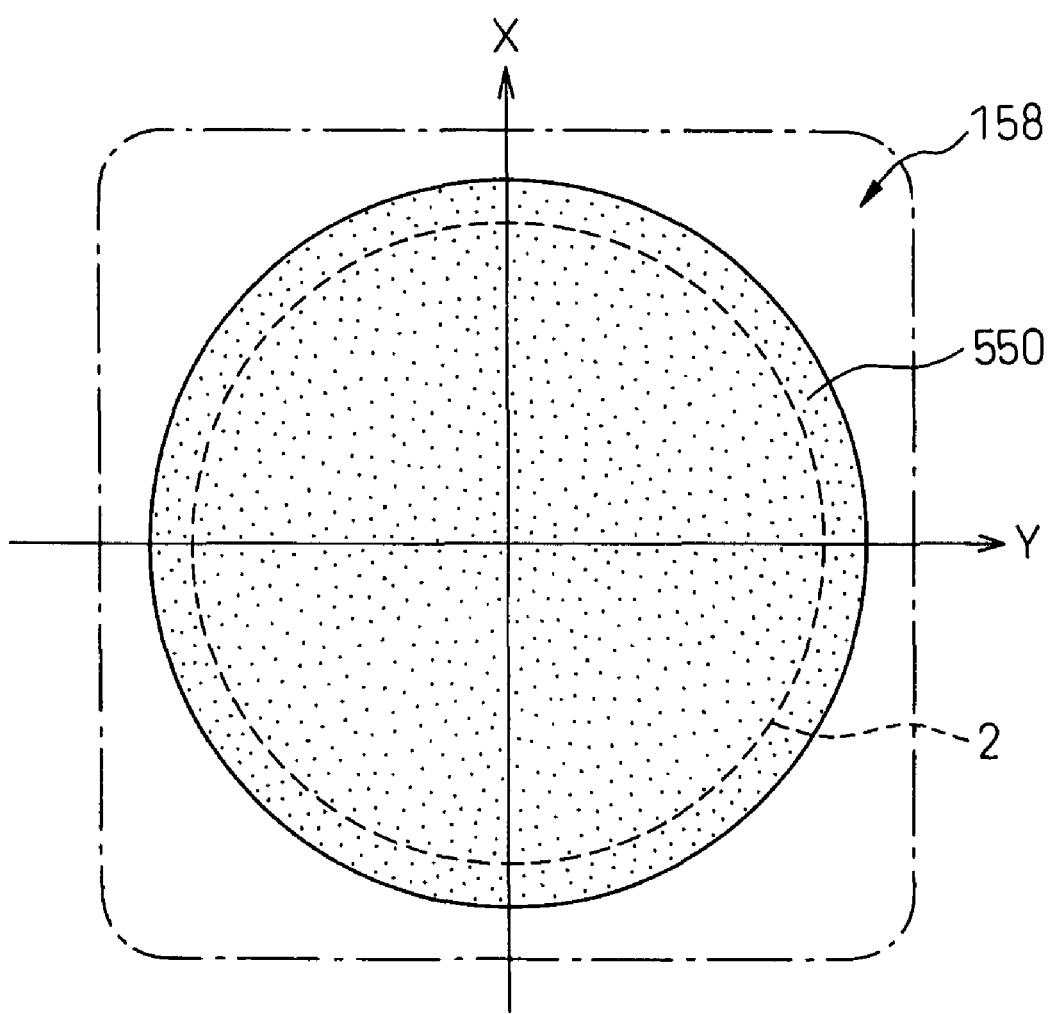
FIG. 6 is a diagram showing one example of the electrode pattern of a second transparent electrode.

FIG. 6 is a diagram showing one example of the electrode pattern of the second transparent electrode.

A circular transparent electrode pattern 550, which is formed as the electrode pattern of the second transparent electrode 158, is for generating a potential difference with respect to the second transparent counter electrode 155 and thereby causing the second liquid crystal layer 120 to function as an nλ/4 plate. Here, the shape of the transparent electrode pattern 550 is not limited to a circular shape, the only requirement being that the pattern be sized and shaped so as to contain the effective diameter 2 of the light beam. Here again, the voltage to be applied to the transparent electrode pattern of the second transparent electrode 158 is supplied via the flexible board 140.

Figure 7:
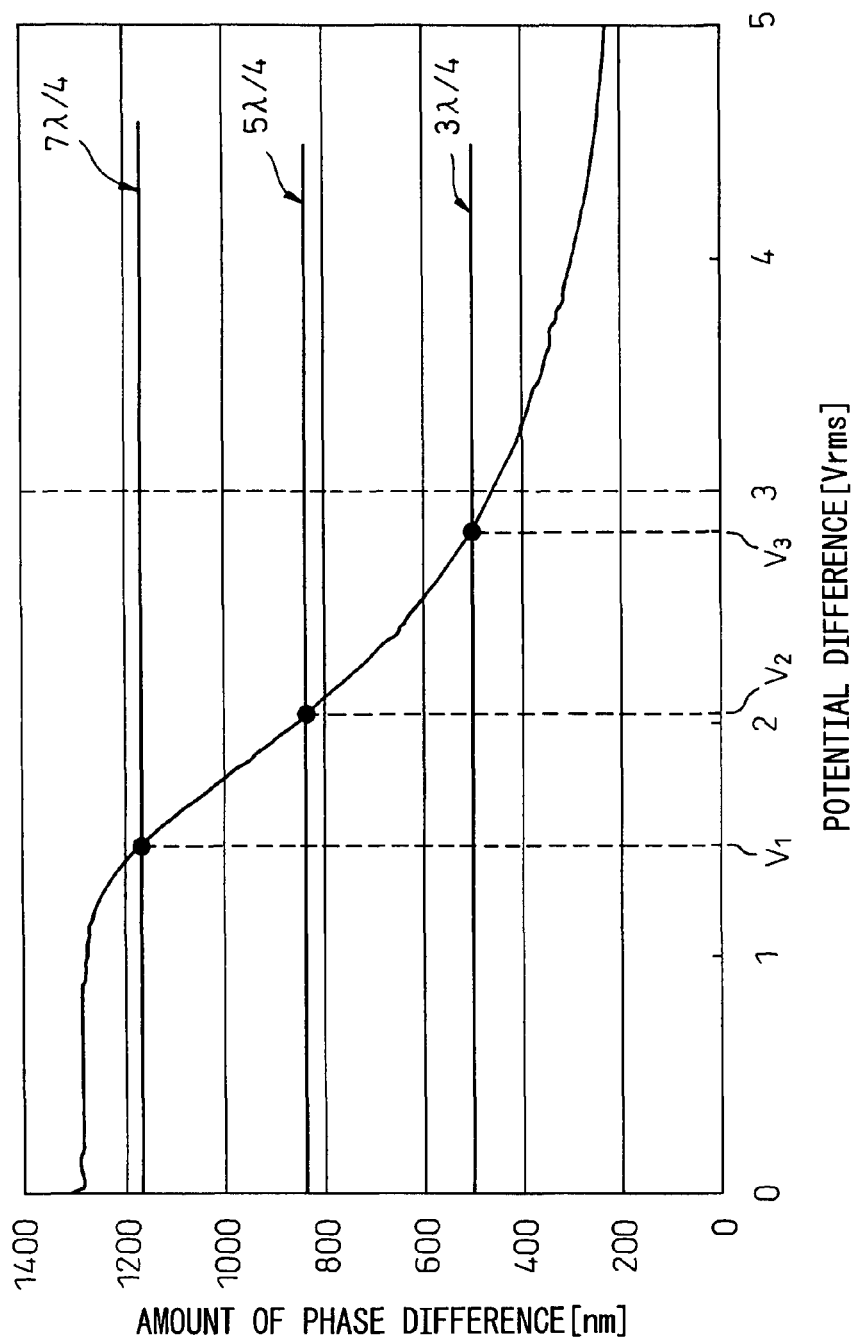
FIG. 7 is a diagram showing the relationship between the amount of phase difference and the potential difference applied to a second liquid crystal layer 120 when a 650-nm light source was used.

FIG. 7 is a diagram showing the relationship between the amount of phase difference and the potential difference applied to the second liquid crystal layer. That is, FIG. 7 shows the results of the measurements for the case where the wavelength of the light source was 650 nm and the 6.0-μm thick second liquid crystal layer 120 of homogeneous alignment was formed using a positive nematic liquid crystal having a Δn of 0.21 and a relative permittivity of 6.9.

As shown in FIG. 7, the potential differences that can cause the second liquid crystal layer 120 to function as the so-called λ/4 plate (i.e., (½)λ±(n/4)λ plate) (where λ=650 nm) are $V_1$ at which it functions as a 7λ/4 plate, $V_2$ at which it functions as a 5λ/4 plate, and $V_3$ at which it functions as a 3λ/4 plate. Here, if the voltage applied to the second liquid crystal layer 120 is increased, the potential difference at which it functions as a λ/4 plate may also be used. However, considering the application of the liquid crystal optical element 100 in a small portable apparatus, the maximum applied potential difference will probably be in the range of about 3 to 5 V. In view of this, the measurements were made as shown below for the cases where the second liquid crystal layer 120 was caused to function as a 3λ/4 plate, a 5λ/4 plate, and a 7λ/4 plate, respectively (see FIGS. 8 to 10).

In making the measurements, first the potential difference to be applied was determined with reference to FIG. 7, thereby causing the second liquid crystal layer to function as a desired nλ/4 plate, and ellipticity was measured by tilting the liquid crystal optical element 100 in increments of one degree from +3 degrees to −3 degrees (for the direction of tilt, see FIG. 2(a)). The measurement of the ellipticity was performed using a rotating analyzer method; that is, for the light beam passing through the liquid crystal optical element 100, the optical power ratio was measured by an optical power meter while rotating the polarizer. For the liquid crystal layer to function effectively as an nλ/4 plate, it is desirable that the ellipticity be not smaller than 0.95.

Figure 8:
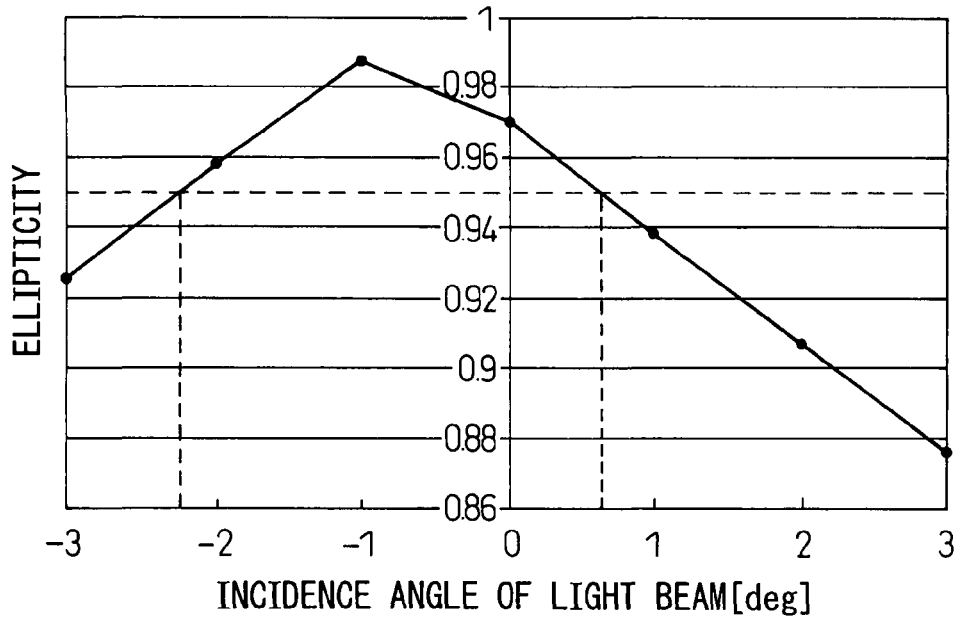
FIG. 8 is a diagram showing the relationship between ellipticity and incidence angle when the 650-nm light source was used and when the second liquid crystal layer 120 was caused to function as the 3λ/4 plate.

FIG. 8 is a diagram showing the relationship between the ellipticity and the incidence angle when the second liquid crystal layer 120 was caused to function as the 3λ/4 plate. The plus and minus signs of the incidence angle indicate the same directions as those defined in FIG. 2(a).

As can be seen in FIG. 8, when the second liquid crystal layer is caused to function as the 3λ/4 plate, the ellipticity is 0.95 or greater in the range of about −2 to +1 degrees, so that in this range the second liquid crystal layer functions correctly as the so-called λ/4 plate. However, in other angle ranges, when the second liquid crystal layer is caused to function as the 3λ/4 plate, the ellipticity is smaller than 0.95. This means that unless the liquid crystal optical element 100 is installed with extremely high accuracy in the optical pickup apparatus, the second liquid crystal layer does not function correctly as the so-called λ/4 plate (the incidence angle dependence is large).

Figure 9:
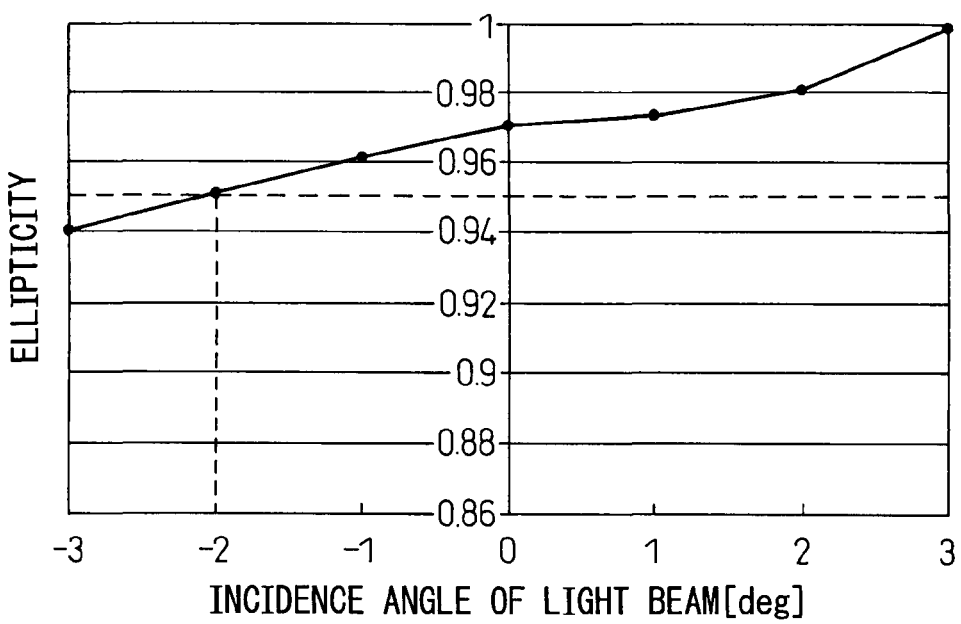
FIG. 9 is a diagram showing the relationship between ellipticity and incidence angle when the 650-nm light source was used and when the second liquid crystal layer 120 was caused to function as the 5λ/4 plate.

FIG. 9 is a diagram showing the relationship between the ellipticity and the incidence angle when the second liquid crystal layer 120 was caused to function as the 5λ/4 plate. The plus and minus signs of the incidence angle indicate the same directions as those defined in FIG. 2(a).

As can be seen in FIG. 9, the ellipticity is 0.95 or greater in the range of about −2 to +3 degrees, so that in this range the second liquid crystal layer functions correctly as the so-called λ/4 plate. However, when the second liquid crystal layer is caused to function as the 5λ/4 plate, the ellipticity becomes smaller than 0.95 when the incidence angle is −2 degrees or larger in the negative direction. This means that unless the liquid crystal optical element 100 is installed with extremely high accuracy in the optical pickup apparatus, the second liquid crystal layer does not function correctly as the so-called λ/4 plate (the incidence angle dependence is large).

Figure 10:
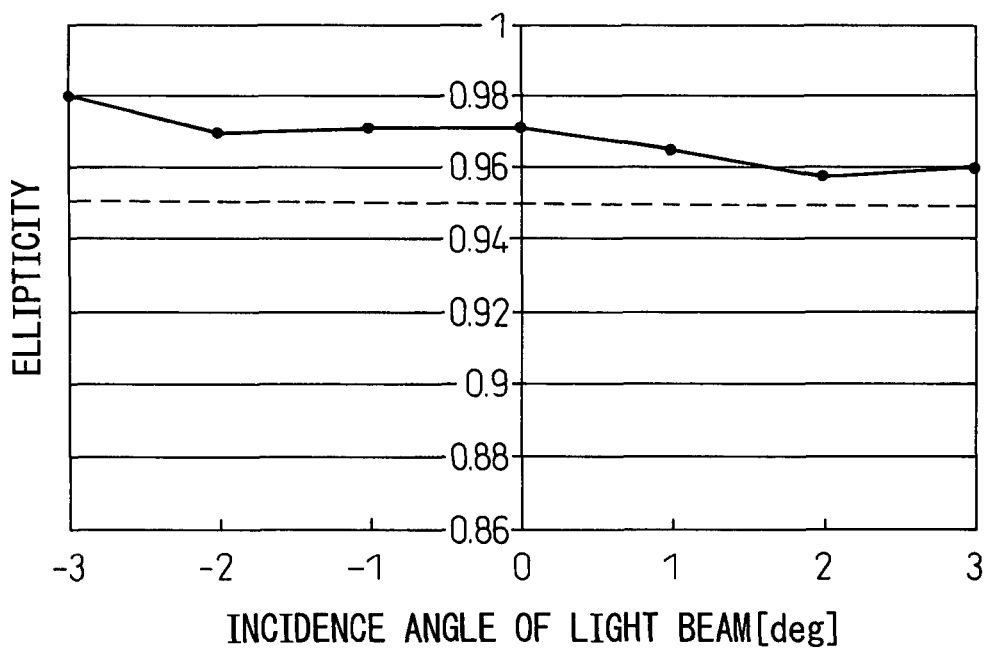
FIG. 10 is a diagram showing the relationship between ellipticity and incidence angle when the 650-nm light source was used and when the second liquid crystal layer 120 was caused to function as the 7λ/4 plate.

FIG. 10 is a diagram showing the relationship between the ellipticity and the incidence angle when the second liquid crystal layer 120 was caused to function as the 7λ/4 plate. The plus and minus signs of the incidence angle indicate the same directions as those defined in FIG. 2(a).

As can be seen in FIG. 10, when the second liquid crystal layer 120 is caused to function as the 7λ/4 plate, the ellipticity is 0.95 or greater in the range of −3 to +3 degrees, and the second liquid crystal layer functions correctly as the so-called λ/4 plate. This means that the liquid crystal optical element 100 should be installed within the range of about −3 to +3 degrees in the optical pickup apparatus, and the installation is thus facilitated (the incidence angle dependence is small).

FIG. 11 is a diagram for explaining the behavior of the liquid crystal molecules in the homogenously aligned second liquid crystal layer 120.

FIG. 11(a) shows the state when no voltage is applied to the second liquid crystal layer 120; as shown, all the liquid crystal molecules 122 are aligned with their long axes tilted by the pretilt angle θ with respect to the second transparent substrate 102.

FIG. 11(b) shows the state when a low potential difference $V_1$ (see FIG. 7) is applied to the second liquid crystal layer 120; in this state, the second liquid crystal layer 120 functions as a 7λ/4 plate. In this case, compared with the state when no voltage is applied, the long axes of the liquid crystal molecules 122, particularly those in the center portion of the liquid crystal layer, are twisted at larger angles than the pretilt angle θ, as shown in FIG. 11(b).

FIG. 11(c) shows the state when a high potential difference $V_3$ (see FIG. 7) is applied to the second liquid crystal layer 120; in this state, the second liquid crystal layer 120 functions as a 3λ/4 plate. In this case, as shown in FIG. 11(c), the long axes of the liquid crystal molecules 122, particularly those in the center portion of the liquid crystal layer, are twisted at larger angles than when the low potential difference is applied.

As can be seen from FIGS. 7 to 10, when the maximum applied voltage is 3 V or higher but not higher than 5 V, the homogenously aligned second liquid crystal layer 120 (layer thickness=6.0 μm, Δn=0.21) functions as the so-called λ/4 plate at orders n=3, 5, and 7. However, it can be understood that, at the highest order n=7, the incidence angle dependence of the homogenously aligned second liquid crystal layer 120 becomes the smallest. This is because, as shown in FIG. 11, as the applied potential difference is increased, the twist of the liquid crystal molecules locally increases, and conversely, as the applied potential difference is reduced, the twist of the liquid crystal molecules reduces as a whole, thereby producing more uniform birefringence. That is, by selecting the highest order n at which the function of the nλ/4 plate can be obtained, or by selecting the lowest potential difference that can provide the function of the nλ/4 plate, a good liquid crystal optical element can be achieved.

The reason that the conditions must be meticulously selected for the liquid crystal optical element 100 is because the first liquid crystal layer 110 that functions as the aberration correcting plate and the second liquid crystal layer 120 that functions as the nλ/4 plate are combined into a single unit. That is, the direction in which the liquid crystal optical element 100 should be tilted in order to prevent the problem caused by reflections from the liquid crystal optical element 100 is determined by the configuration of the first liquid crystal layer 110, and since that direction is not a preferable direction for the second liquid crystal layer 120 (not the direction that cancels the pretilt angle θ), the intended function cannot be achieved unless optimum conditions are selected for the second liquid crystal layer 120 to function as the nλ/4 plate.

Next, ellipticity was measured using another liquid crystal optical element 200 which was constructed using an alternative second liquid crystal layer 201 whose thickness was reduced from 6.0 μm to 5.0 μm. The wavelength of the light source was 650 nm. The liquid crystal optical element 200 is not shown here, since its structure is the same as that of the liquid crystal optical element 100 except for the layer thickness.

FIG. 12 is a diagram showing the relationship between the amount of phase difference and the potential difference applied to the alternative second liquid crystal layer.

FIG. 12 shows the results of the measurements for the case where the wavelength of the light source was 650 nm and the 5.0-μm thick alternative second liquid crystal layer 201 of homogenous alignment was formed using a positive nematic liquid crystal having a Δn of 0.21 and a relative permittivity of 6.9.

As shown in FIG. 12, the potential differences that can cause the alternative second liquid crystal layer 201 to function as the so-called λ/4 plate (i.e., (½)λ±(n/4)λ plate) (where λ=650 nm) are $V_4$ at which it functions as a 5λ/4 plate and $V_5$ at which it functions as a 3λ/4 plate. Here, if the potential difference applied to the alternative second liquid crystal layer 201 is increased, the voltage at which it functions as a λ/4 plate may also be used. However, considering the application of the liquid crystal optical element 200 in a small portable apparatus, the maximum applied potential difference will probably be in the range of about 3 to 5 V. In view of this, the measurements were made as shown below for the cases where the alternative second liquid crystal layer 201 was caused to function as a 3λ/4 plate and a 5λ/4 plate, respectively (see FIGS. 13 and 14).

In making the measurements, first the potential difference to be applied was determined with reference to FIG. 12, thereby causing the alternative second liquid crystal layer 201 to function as a desired nλ/4 plate, and ellipticity was measured by tilting the liquid crystal optical element 200 in increments of one degree from +3 degrees to −3 degrees (for the direction of tilt, see FIG. 2(a)). The ellipticity was measured using the same method as that for the liquid crystal optical element 100. For the liquid crystal layer to function effectively as an $n\lambda/4$ plate, it is desirable that the ellipticity be not smaller than 0.95.

Figure 13:
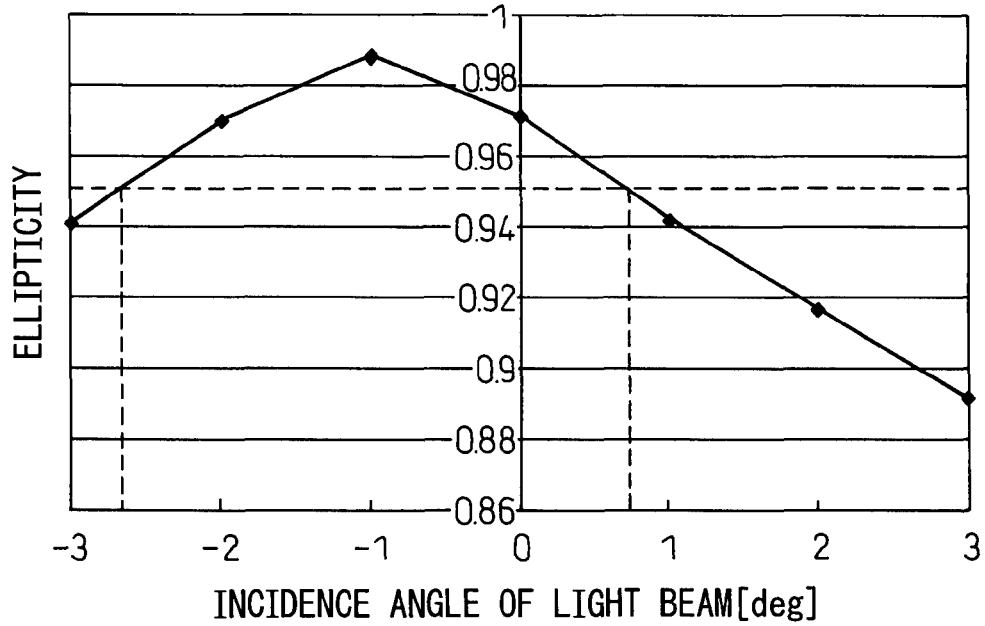
FIG. 13 is a diagram showing the relationship between ellipticity and incidence angle when the 650-nm light source was used and when the alternative second liquid crystal layer 201 was caused to function as the 3λ/4 plate.

FIG. 13 is a diagram showing the relationship between the ellipticity and the incidence angle when the second liquid crystal layer 201 was caused to function as the $3\lambda/4$ plate. The plus and minus signs of the incidence angle indicate the same directions as those defined in FIG. 2(a).

As can be seen in FIG. 13, when the second liquid crystal layer 201 is caused to function as the $3\lambda/4$ plate, the ellipticity is 0.95 or greater in the range of about $-2$ to $+1$ degrees, so that in this range the second liquid crystal layer functions correctly as the so-called $\lambda/4$ plate. However, in other angle ranges, when the second liquid crystal layer 201 is caused to function as the $3\lambda/4$ plate, the ellipticity is smaller than 0.95. This means that unless the liquid crystal optical element 200 is installed with extremely high accuracy in the optical pickup apparatus, the second liquid crystal layer does not function correctly as the so-called $\lambda/4$ plate (the incidence angle dependence is large).

Figure 14:
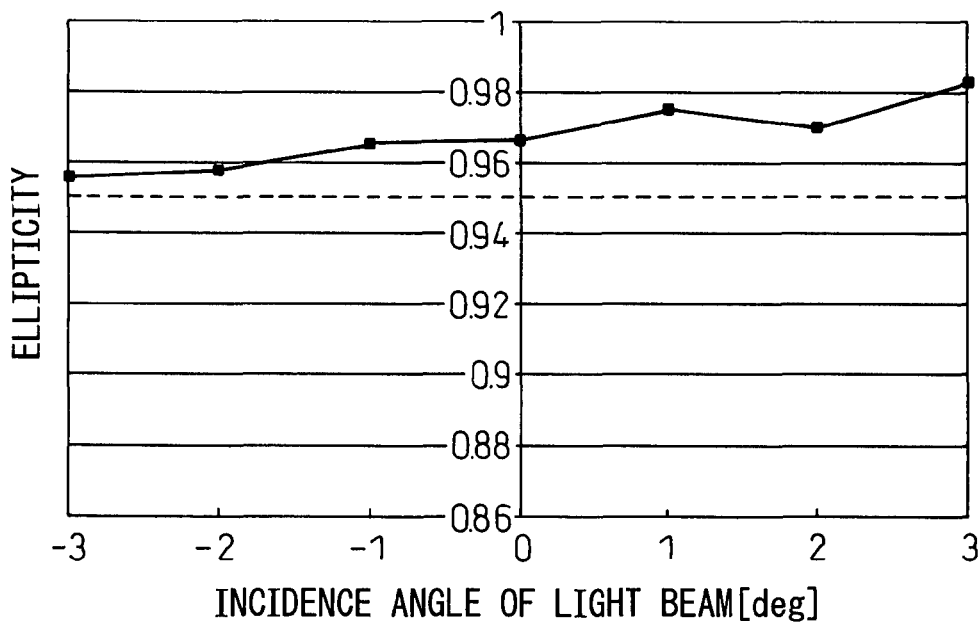
FIG. 14 is a diagram showing the relationship between ellipticity and incidence angle when the 650-nm light source was used and when the alternative second liquid crystal layer 201 was caused to function as the 5λ/4 plate.

FIG. 14 is a diagram showing the relationship between the ellipticity and the incidence angle when the second liquid crystal layer 201 was caused to function as the $5\lambda/4$ plate. The plus and minus signs of the incidence angle indicate the same directions as those defined in FIG. 2(a).

As can be seen in FIG. 14, when the second liquid crystal layer 201 is caused to function as the $5\lambda/4$ plate, the ellipticity is 0.95 or greater in the range of $-3$ to $+3$ degrees, and the second liquid crystal layer functions correctly as the so-called $\lambda/4$ plate. This means that the liquid crystal optical element 200 should be installed within the range of about $-3$ to $+3$ degrees in the optical pickup apparatus, and the installation is thus facilitated (the incidence angle dependence is small).

As can be seen from FIGS. 12 to 14, when the maximum applied voltage is 3 V or higher but not higher than 5 V, the homogenously aligned second liquid crystal layer 201 (layer thickness=5.0 μm, $\Delta n$=0.21) functions as the so-called $\lambda/4$ plate at orders $n=3$ and 5, but it can be seen that the incidence angle dependence becomes the smallest at the highest order $n=5$. That is, by selecting the highest order n at which the function of the $n\lambda/4$ plate can be obtained, or by selecting the lowest potential difference that can provide the function of the $n\lambda/4$ plate, a good liquid crystal optical element can be achieved. Further, as can be seen from a comparison between FIGS. 7 to 10 and FIGS. 12 to 14, the conditions for achieving a good liquid crystal optical element do not change even when the thickness of the liquid crystal layer is changed.

Next, ellipticity was measured using the liquid crystal optical element 100 having the second liquid crystal layer 120 when the wavelength of the light source was changed (to 780 nm).

Figure 15:
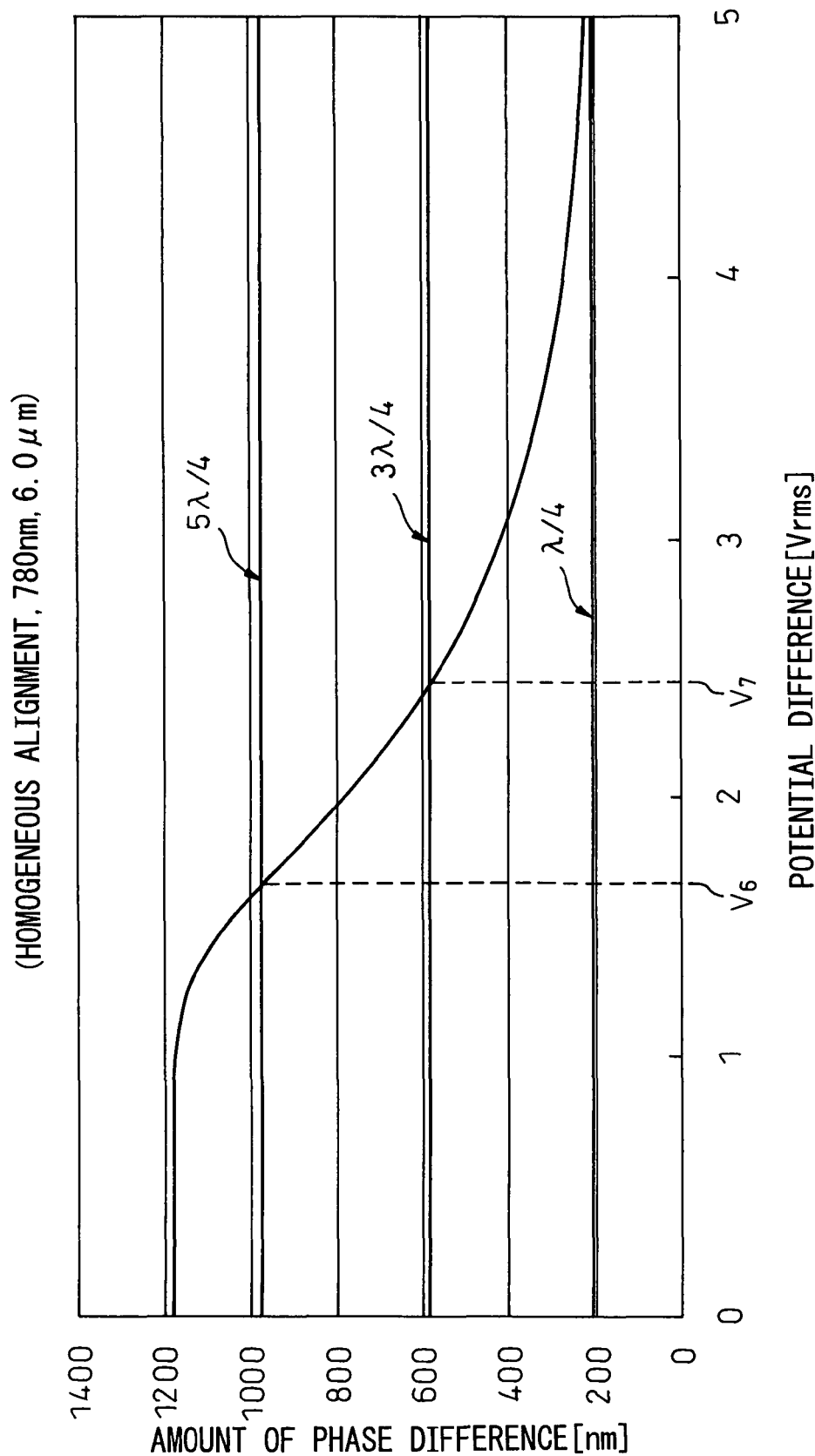
FIG. 15 is a diagram showing the relationship between the amount of phase difference and the voltage applied to the second liquid crystal layer 120 when a 780-nm light source was used.

FIG. 15 is a diagram showing the relationship between the amount of phase difference and the potential difference applied to the second liquid crystal layer 120 when the wavelength of the light source was changed.

FIG. 15 shows the results of the measurements for the case where the wavelength of the light source was 780 nm and the 6.0-μm thick second liquid crystal layer 120 of homogenous alignment was formed using a positive nematic liquid crystal having a $\Delta n$ of 0.21 and a relative permittivity of 6.9.

As shown in FIG. 15, the potential differences that can cause the second liquid crystal layer 120 to function as the so-called $\lambda/4$ plate (i.e., $(\frac{1}{2})\lambda\pm(n/4)\lambda$ plate) (where $\lambda$=780 nm) are $V_6$ at which it functions as a $5\lambda/4$ plate and $V_7$ at which it functions as a $3\lambda/4$ plate. Here, if the potential difference applied to the second liquid crystal layer 120 is increased, the voltage at which it functions as the so-called $\lambda/4$ plate may also be used. However, considering the application of the liquid crystal optical element 100 in a small portable apparatus, the maximum applied potential difference will probably be in the range of about 3 to 5 V. In view of this, the measurements were made as shown below for the cases where the second liquid crystal layer 120 was caused to function as a $3\lambda/4$ plate and a $5\lambda/4$ plate, respectively (see FIGS. 16 and 17).

In making the measurements, first the potential difference to be applied was determined with reference to FIG. 15, thereby causing the second liquid crystal layer 120 to function as a desired $n\lambda/4$ plate, and ellipticity was measured by tilting the liquid crystal optical element 100 in increments of one degree from $+3$ degrees to $-3$ degrees (for the direction of tilt, see FIG. 2(a)). The ellipticity was measured using the same method as that for the liquid crystal optical element 100. For the liquid crystal layer to function effectively as an $n\lambda/4$ plate, it is desirable that the ellipticity be not smaller than 0.95.

Figure 16:
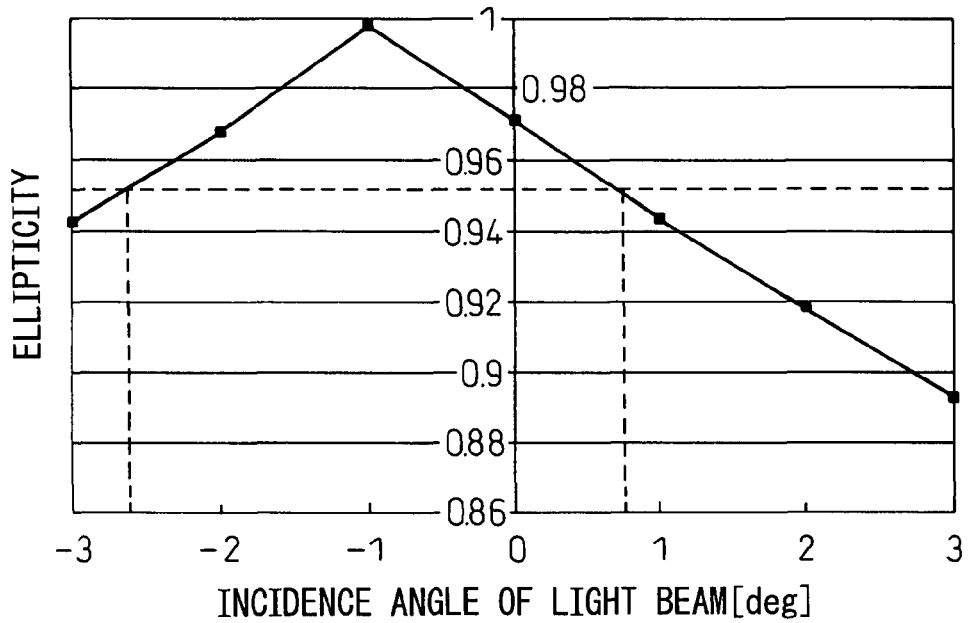
FIG. 16 is a diagram showing the relationship between ellipticity and incidence angle when the 780-nm light source was used and when the second liquid crystal layer 120 was caused to function as the 3λ/4 plate.

FIG. 16 is a diagram showing the relationship between the ellipticity and the incidence angle when the second liquid crystal layer 120 was caused to function as the $3\lambda/4$ plate. The plus and minus signs of the incidence angle indicate the same directions as those defined in FIG. 2(a).

As can be seen in FIG. 16, when the second liquid crystal layer 120 is caused to function as the $3\lambda/4$ plate, the ellipticity is 0.95 or greater in the range of about $-3$ to $+1$ degrees, so that in this range the second liquid crystal layer functions correctly as the so-called $\lambda/4$ plate, but in other angle ranges, the ellipticity is smaller than 0.95. This means that unless the liquid crystal optical element 100 is installed with extremely high accuracy in the optical pickup apparatus, the second liquid crystal layer does not function correctly as the so-called $\lambda/4$ plate (the incidence angle dependence is large).

Figure 17:
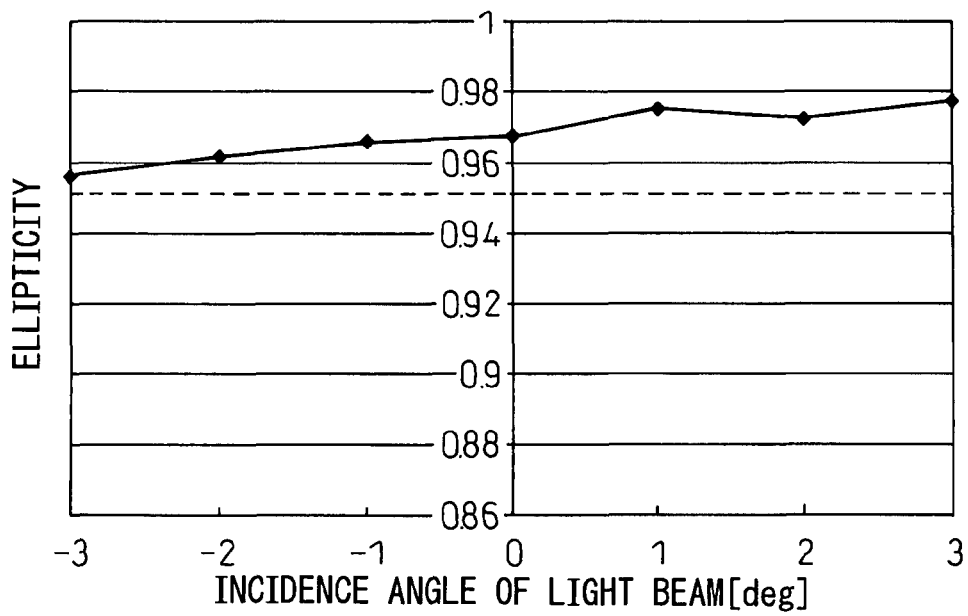
FIG. 17 is a diagram showing the relationship between ellipticity and incidence angle when the 780-nm light source was used and when the second liquid crystal layer 120 was caused to function as the 5λ/4 plate.

FIG. 17 is a diagram showing the relationship between the ellipticity and the incidence angle when the second liquid crystal layer 120 was caused to function as the $5\lambda/4$ plate. The plus and minus signs of the incidence angle indicate the same directions as those defined in FIG. 2(a).

As can be seen in FIG. 17, when the second liquid crystal layer 120 is caused to function as the $5\lambda/4$ plate, the ellipticity is 0.95 or greater in the range of $-3$ to $+3$ degrees, and the second liquid crystal layer functions correctly as the so-called $\lambda/4$ plate. This means that the liquid crystal optical element 100 should be installed within the range of about $-3$ to $+3$ degrees in the optical pickup apparatus, and the installation is thus facilitated (the incidence angle dependence is small).

Next, ellipticity was measured when the wavelength of the light source was changed to 780 nm for the case of the alternative second liquid crystal layer 201 whose thickness was reduced from 6.0 μm to 5.0 μm.

Figure 18:
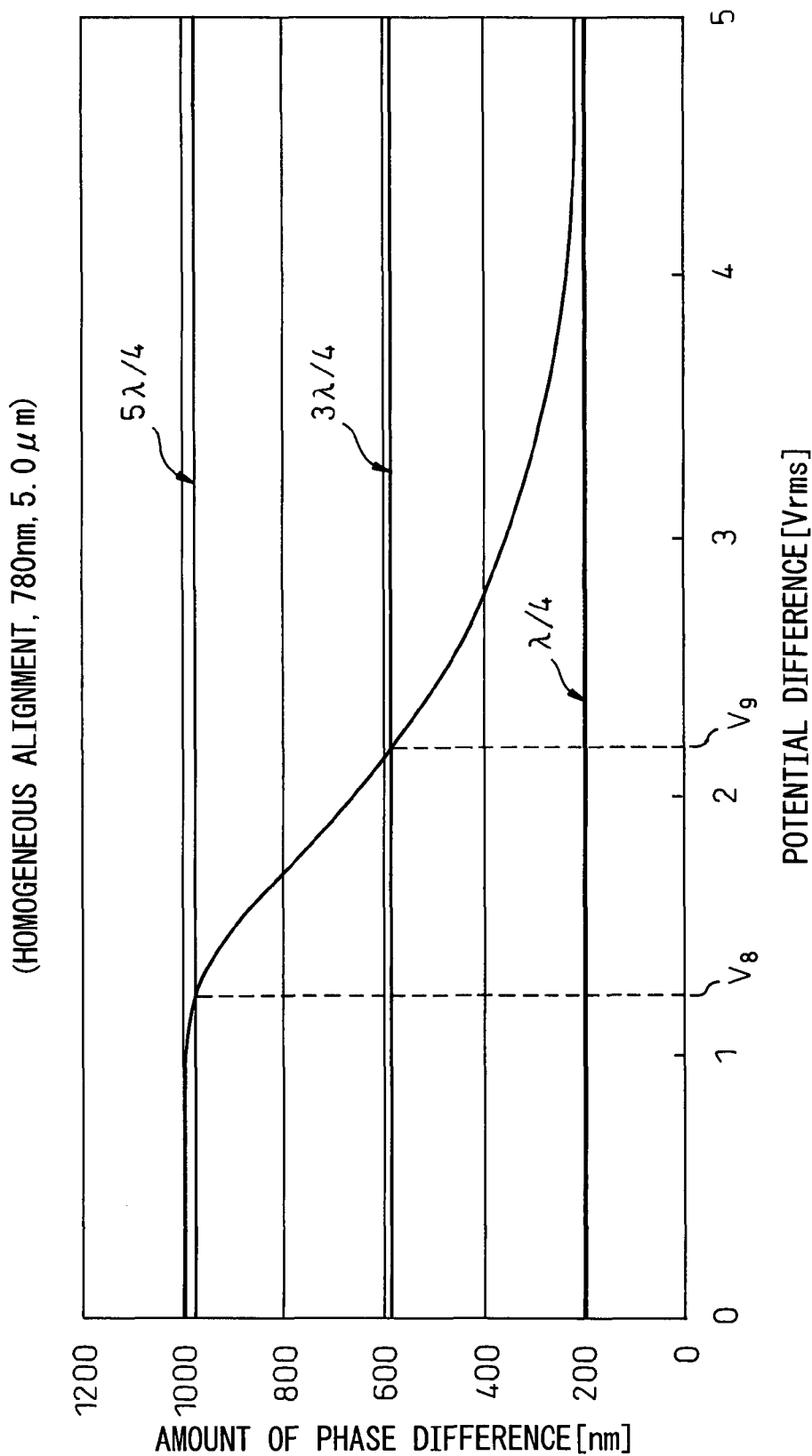
FIG. 18 is a diagram showing the relationship between the amount of phase difference and the voltage applied to the alternative second liquid crystal layer 201 when the 780-nm light source was used.

FIG. 18 is a diagram showing the relationship between the amount of phase difference and the potential difference applied to the alternative second liquid crystal layer 201 when the wavelength of the light source was changed. That is, FIG. 18 shows the results of the measurements for the case where the wavelength of the light source was 780 nm and the 5.0-μm thick alternative second liquid crystal layer 201 of homogenous alignment was formed using a positive nematic liquid crystal having a $\Delta n$ of 0.20 and a relative permittivity of 6.9.

As shown in FIG. 18, the potential differences that can cause the alternative second liquid crystal layer 201 to function as the so-called $\lambda/4$ plate (i.e., $(\frac{1}{2})\lambda\pm(n/4)\lambda$ plate) (where $\lambda$=780 nm) are $V_8$ at which it functions as a $5\lambda/4$ plate and $V_9$ at which it functions as a $3\lambda/4$ plate. Here, if the potential difference applied to the alternative second liquid crystal layer 201 is increased, the voltage at which it functions as a λ/4 plate may also be used. However, considering the application of the liquid crystal optical element 200 in a small portable apparatus, the maximum applied potential difference will probably be in the range of about 3 to 5 V. In view of this, the measurements were made as shown below for the cases where the alternative second liquid crystal layer 201 was caused to function as a 3λ/4 plate and a 5λ/4 plate, respectively (see FIGS. 19 and 20).

In making the measurements, first the potential difference to be applied was determined with reference to FIG. 18, thereby causing the alternative second liquid crystal layer 201 to function as a desired nλ/4 plate, and ellipticity was measured by tilting the liquid crystal optical element 200 in increments of one degree from +3 degrees to −3 degrees (for the direction of tilt, see FIG. 2(a)). The ellipticity was measured using the same method as that for the liquid crystal optical element 100. For the liquid crystal layer to function effectively as an nλ/4 plate, it is desirable that the ellipticity be not smaller than 0.95.

Figure 19:
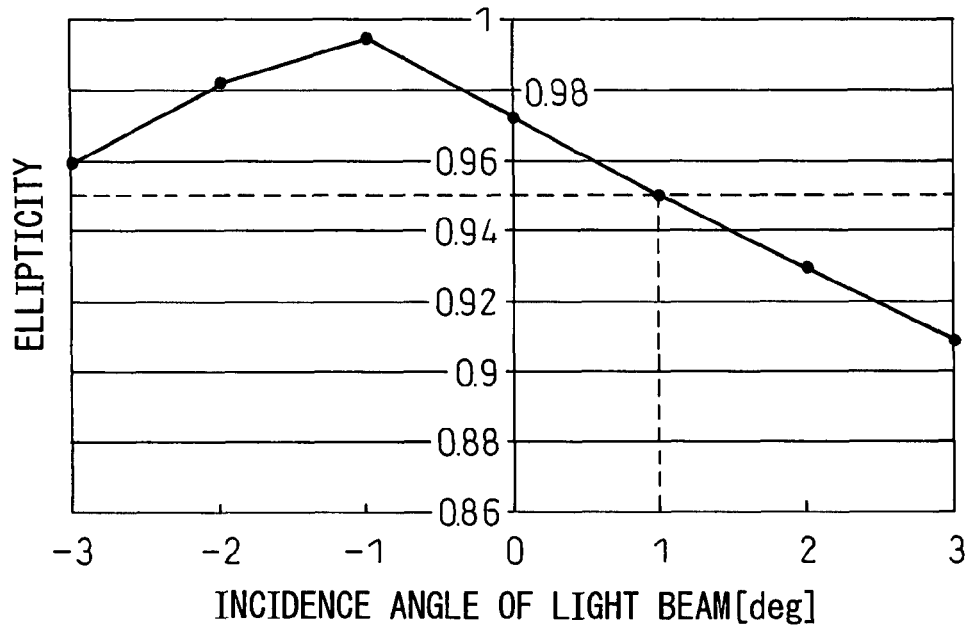
FIG. 19 is a diagram showing the relationship between ellipticity and incidence angle when the 780-nm light source was used and when the alternative second liquid crystal layer 201 was caused to function as the 3λ/4 plate.

FIG. 19 is a diagram showing the relationship between the ellipticity and the incidence angle when the alternative second liquid crystal layer 201 was caused to function as the 3λ/4 plate. The plus and minus signs of the incidence angle indicate the same directions as those defined in FIG. 2(a).

As can be seen in FIG. 19, when the alternative second liquid crystal layer 201 is caused to function as the 3λ/4 plate, the ellipticity is 0.95 or greater in the range of about −3 to +1 degrees, so that in this range the second liquid crystal layer functions correctly as the so-called λ/4 plate, but in other angle ranges, the ellipticity is smaller than 0.95. This means that unless the liquid crystal optical element 200 is installed with extremely high accuracy in the optical pickup apparatus, the second liquid crystal layer does not function correctly as the so-called λ/4 plate (the incidence angle dependence is large).

Figure 20:
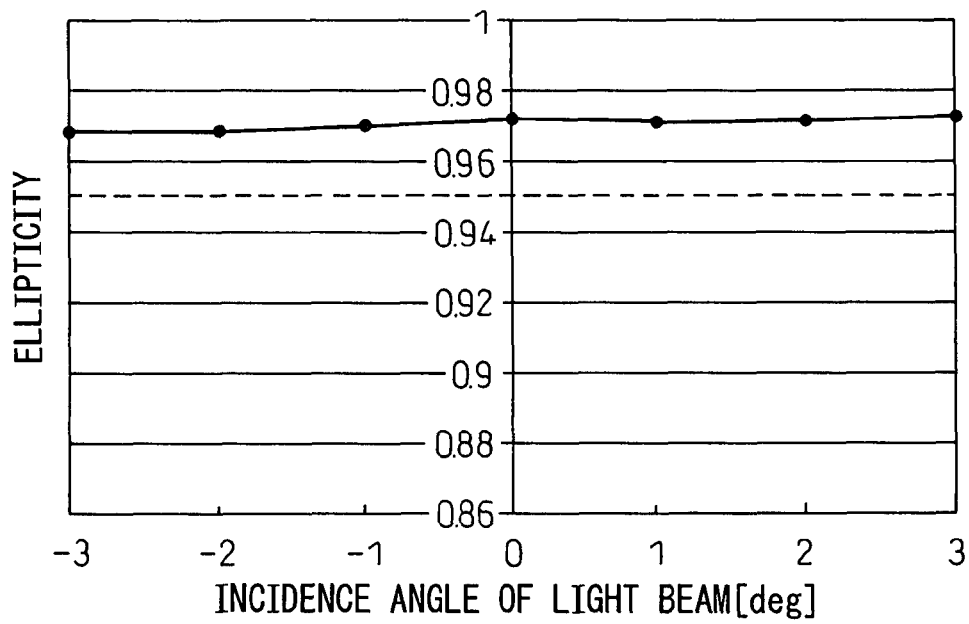
FIG. 20 is a diagram showing the relationship between ellipticity and incidence angle when the 780-nm light source was used and when the alternative second liquid crystal layer 201 was caused to function as the 5λ/4 plate.

FIG. 20 is a diagram showing the relationship between the ellipticity and the incidence angle when the alternative second liquid crystal layer 201 was caused to function as the 5λ/4 plate. The plus and minus signs of the incidence angle indicate the same directions as those defined in FIG. 2(a).

As can be seen in FIG. 20, when the alternative second liquid crystal layer 201 is caused to function as the 5λ/4 plate, the ellipticity is 0.95 or greater in the range of −3 to +3 degrees, and the second liquid crystal layer functions correctly as the so-called λ/4 plate. This means that the liquid crystal optical element 200 should be installed within the range of about −3 to +3 degrees in the optical pickup apparatus, and the installation is thus facilitated (the incidence angle dependence is small).

As can be seen from FIGS. 15 to 20, when the maximum applied voltage is 3 V or higher but not higher than 5 V, the homogenously aligned second liquid crystal layer 120 (layer thickness=6.0 μm, Δn=0.21) or the alternative second liquid crystal layer 201 (layer thickness=5.0 μm, Δn=0.20) functions as the so-called λ/4 plate at orders n=3 and 5, but it can be seen that the incidence angle dependence becomes the smallest at the highest order n=5. That is, by selecting the highest order n at which the function of the nλ/4 plate can be obtained, or by selecting the lowest potential difference that can provide the function of the nλ/4 plate, a good liquid crystal optical element can be achieved. Further, as can be seen from a comparison between FIGS. 7 to 10 and FIGS. 15 to 20, the conditions for achieving a good liquid crystal optical element do not change even when the emission wavelength is changed.

Next, ellipticity was measured using another liquid crystal optical element 210 which was constructed using a further alternative second liquid crystal layer 211 whose liquid crystal material was changed from the homogeneous alignment type to the vertical alignment type. The wavelength of the light source was 650 nm. The liquid crystal optical element 210 is not shown here, because its structure is the same as that of the liquid crystal optical element 100 except for the use of the vertically aligned liquid crystal.

FIG. 21 is a diagram showing the relationship between the amount of phase difference and the potential difference applied to the further alternative second liquid crystal layer 211 formed from the vertically aligned liquid crystal.

That is, FIG. 21 shows the results of the measurements for the case where the wavelength of the light source was 650 nm and the 6.0-μm thick further alternative second liquid crystal layer 211 of vertical alignment was formed using a negative nematic liquid crystal having a Δn of 0.15 and a relative permittivity of −4.2.

As shown in FIG. 21, the potential differences that can cause the further alternative second liquid crystal layer 211 to function as the so-called λ/4 plate (i.e., (½)λ±(n/4)λplate) (where X=650 nm) are $V_{10}$ at which it functions as a λ/4 plate and $V_{11}$ at which it functions as a 3λ/4 plate.

FIG. 22 is a diagram for explaining the behavior of the liquid crystal molecules in the further alternative second liquid crystal layer 211 of vertical alignment.

FIG. 22(a) shows the state when no voltage is applied to the further alternative second liquid crystal layer 211; as shown, all the liquid crystal molecules 123 are aligned with their long axes oriented substantially perpendicular to the second transparent substrate 102.

FIG. 22(b) shows the state when a low potential difference $V_{10}$ (see FIG. 21) is applied to the further alternative second liquid crystal layer 211; in this state, the further alternative second liquid crystal layer 211 functions as a λ/4 plate. In this case, as shown in FIG. 22(b), the long axes of the liquid crystal molecules 123, particularly those in the center portion of the liquid crystal layer, are somewhat twisted, compared with the state when no voltage is applied.

FIG. 22(c) shows the state when a high potential difference $V_{11}$ (see FIG. 21) is applied to the further alternative second liquid crystal layer 211; in this state, the further alternative second liquid crystal layer 211 functions as a 3λ/4 plate. In this case, as shown in FIG. 22(c), the long axes of the liquid crystal molecules 123, particularly those in the center portion of the liquid crystal layer, are further twisted, compared with the state when the low potential difference is applied.

From FIGS. 21 and 22, it is presumed that the second liquid crystal layer 211 of vertical alignment can function as the so-called λ/4 plate at orders n=1, 3, 5, 7, . . . , but the incidence angle dependence becomes the smallest at the lowest order n=1. This is because, as shown in FIG. 21, as the applied potential difference is increased, the twist of the liquid crystal molecules locally increases, and conversely, as the applied potential difference is reduced, the twist of the liquid crystal molecules reduces as a whole, thereby producing more uniform birefringence. That is, by selecting the lowest order n at which the function of the nλ/4 plate can be obtained, or by selecting the lowest potential difference that can provide the function of the nλ/4 plate, a good liquid crystal optical element can be achieved.

FIG. 23 is a diagram for explaining another example of the electrode pattern of the first transparent electrode and its function.

FIG. 23(a) shows a coma correcting transparent electrode pattern formed as the first transparent electrode 151, FIG. 23(b) shows an example of the voltage applied to the transparent electrode pattern of the first transparent electrode 151, and FIG. 23(c) shows an example of coma as improved by the transparent electrode pattern of the first transparent electrode 151.

In the optical pickup apparatus 10 which reads or writes data on the recording medium 4, the light beam from the light source 11 is converted by the collimator lens 12 into a substantially parallel beam of light, which is then focused by the objective lens 14 onto the recording medium 4, and an information signal is generated by receiving the light beam reflected from the recording medium 4. In such an optical pickup apparatus, when reading or writing data on the recording medium, the light beam focused by the objective lens 14 must be made to accurately follow the track of the recording medium 4. However, there are cases where the recording medium 4 is tilted because of warping or deflection of the recording medium 4 or imperfections in the driving mechanism of the recording medium 4. When the optical axis of the light beam focused by the objective lens 14 is tilted relative to the track of the recording medium 4, an aberration called coma occurs in the substrate of the recording medium 4. That is, coma 620 such as shown in FIG. 23(b) occurs, leading to a degradation of the information signal which is generated based on the reflected beam from the recording medium 4.

In FIG. 23(a), electrode patterns 601 to 605 are formed as shown within the range of the effective diameter 2. Voltage 610 such as shown in FIG. 23(b) is applied to each region. When the voltage 610 such as shown in FIG. 23(b) is applied to the transparent electrode pattern of the first transparent electrode 151 such as shown in FIG. 23(a), a potential difference occurs with respect to the first transparent counter electrode 154, and the alignment of the liquid crystal between them changes according to the potential difference. As a result, the light beam passing through this portion experiences an effect that advances its phase according to the potential difference. With this effect, the coma 620 occurring in the substrate of the recording medium 4 is corrected as shown by the coma 630 in FIG. 23(c). Here, the voltage to be applied to the transparent electrode pattern of the first transparent electrode 151 is supplied via the flexible board 140.

FIG. 24 is a diagram for explaining still another example of the electrode pattern of the first transparent electrode and its function.

Figure 25A:
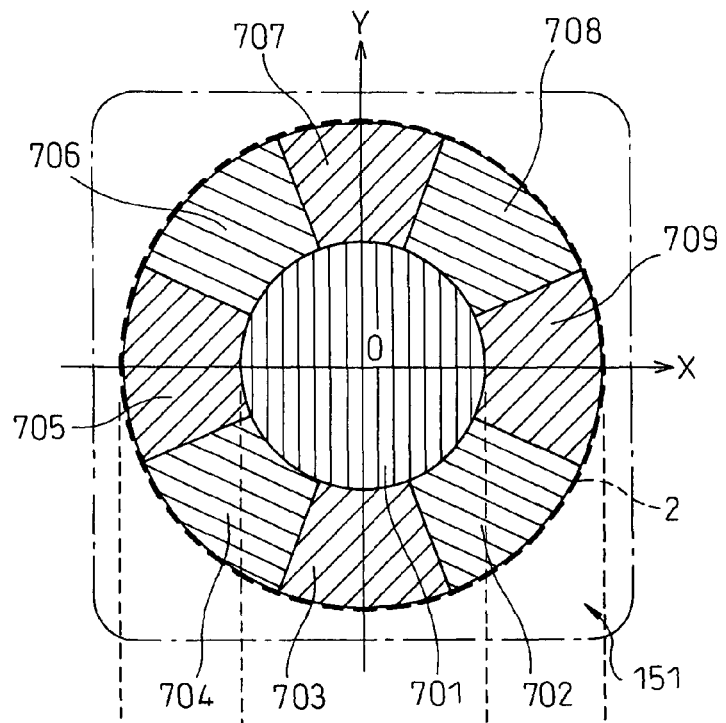
FIG. 25(a) is a diagram showing the astigmatism correcting transparent electrode pattern formed as the first transparent electrode 151.

FIG. 24(a) shows an astigmatism correcting transparent electrode pattern formed as the first transparent electrode 151, FIG. 24(b) shows an example of the voltage applied in the Y-axis direction of the transparent electrode pattern of the first transparent electrode 151, and FIG. 24(c) shows an example of astigmatism in the Y-axis direction as improved by the transparent electrode pattern of the first transparent electrode 151. FIG. 25(a) shows the transparent electrode pattern of FIG. 24(a) when it is rotated through 90 degrees, FIG. 25(b) shows an example of the voltage applied in the X-axis direction of the transparent electrode pattern of the first transparent electrode 151, and FIG. 25(c) shows an example of astigmatism in the X-axis direction as improved by the transparent electrode pattern of the first transparent electrode 151.

Figure 25B:
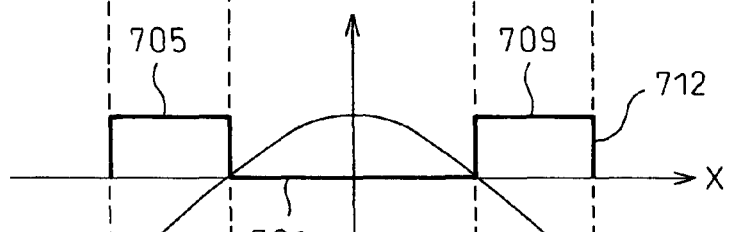
FIG. 25(b) is a diagram showing an example of the voltage applied in the X-axis direction of the transparent electrode pattern of the first transparent electrode 151.
Figure 25C:
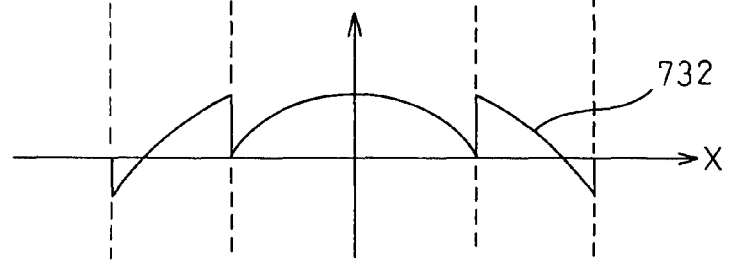
FIG. 25(c) is a diagram showing an example of astigmatism in the X-axis direction as improved by the transparent electrode pattern of the first transparent electrode 151.

In the optical pickup apparatus 10 which reads or writes data on the recording medium 4, due to the problem of the astigmatic difference of the semiconductor laser, etc. astigmatism 720 such as shown in FIG. 24(b) occurs in the Y-axis direction in the light beam emitted from the light source 11, and astigmatism 722 such as shown in FIG. 25(b) occurs in the X-axis direction, leading to a degradation of the information signal which is generated based on the reflected beam from the recording medium 4.

In FIG. 24(a) or 25(a), electrode patterns 701 to 709 are formed as shown within the range of the effective diameter 2. Voltage 710 such as shown in FIG. 24(b) and voltage 712 such as shown in FIG. 25(b) are applied to each region. When the voltage 710 such as shown in FIG. 24(b) and the voltage 712 such as shown in FIG. 25(b) are applied to the transparent electrode pattern of the first transparent electrode 151 such as shown in FIG. 24(a) or 25(a), a potential difference occurs with respect to the first transparent counter electrode 154, and the alignment of the liquid crystal between them changes according to the potential difference. As a result, the light beam passing through this portion experiences an effect that advances its phase according to the potential difference. With this effect, the astigmatism 720 in the Y-axis direction and the astigmatism in the X-axis direction, occurring in the substrate of the recording medium 4, are corrected as shown by the astigmatism 730 in FIG. 24(c) and the astigmatism 732 in FIG. 25(c), respectively. Here, the voltage to be applied to the transparent electrode pattern of the first transparent electrode 151 is supplied via the flexible board 140.

What is claimed is:

1. An optical pickup apparatus comprising:
    a light source for emitting a light beam;
    a liquid crystal optical element having a first liquid crystal layer for correcting aberration and a second liquid crystal layer functioning as an nλ/4 plate in an integral fashion, said liquid crystal optical element being disposed at an angle relative to an optical axis of said light beam, said angle being in a direction that cancels a pretilt angle of said first liquid crystal layer;
    a transparent electrode for generating a potential difference on said second liquid crystal layer in order to control an amount of phase difference for said light beam passing through said second liquid crystal layer;
    an objective lens for focusing the light beam passed through said liquid crystal optical element; and
    a driver for driving said transparent electrode so as to generate a potential difference that is the lowest among a plurality of potential differences that cause an area of said second liquid crystal layer which includes at least an effective diameter of the light beam to function as an nλ/4 plate.

2. The optical pickup apparatus according to claim 1, wherein the angle that a rubbing direction of said first liquid crystal layer makes with a rubbing direction of said second liquid crystal layer is approximately 45 degrees.

3. The optical pickup apparatus according to claim 2, wherein said liquid crystal optical element is tilted in a direction that matches the rubbing direction of said first liquid crystal layer.

4. The optical pickup apparatus according to claim 1, wherein said first liquid crystal layer corrects coma, spherical aberration, or astigmatism.

5. The optical pickup apparatus according to claim 1, wherein said first liquid crystal layer and said second liquid crystal layer are provided alternately between three transparent substrates in said liquid crystal optical element.

6. An optical pickup apparatus comprising:
    a light source for emitting a light beam;
    a liquid crystal optical element having a first liquid crystal layer for correcting aberration and a vertically aligned second liquid crystal layer functioning as an nλ/4 plate in an integral fashion, said liquid crystal optical element being disposed at an angle relative to an optical axis of said light beam, said angle being in a direction that cancels a pretilt angle of said first liquid crystal layer;

a transparent electrode for generating a potential difference on said second liquid crystal layer in order to control an amount of phase difference for said light beam passing through said second liquid crystal layer;

an objective lens for focusing the light beam passed through said liquid crystal optical element; and a driver for driving said transparent electrode so as to generate a potential difference corresponding to the amount of phase difference that achieves the lowest order n among a plurality of amounts of phase difference that cause an area of said second liquid crystal layer which includes at least an effective diameter of the light beam to function as an $n\lambda/4$ plate.

7. The optical pickup apparatus according to claim 6, wherein the angle that a rubbing direction of said first liquid crystal layer makes with a rubbing direction of said second liquid crystal layer is approximately 45 degrees.

8. The optical pickup apparatus according to claim 7, wherein said liquid crystal optical element is tilted in a direction that matches the rubbing direction of said first liquid crystal layer.

9. The optical pickup apparatus according to claim 6, wherein said first liquid crystal layer corrects coma, spherical aberration, or astigmatism.

10. The optical pickup apparatus according to claim 6, wherein said first liquid crystal layer and said second liquid crystal layer are provided alternately between three transparent substrates in said liquid crystal optical element.

11. A liquid crystal optical element disposed at an angle relative to an optical axis of a light beam, comprising:

a first liquid crystal layer for correcting aberration;

a second liquid crystal layer functioning as an $n\lambda/4$ plate and combined in an integral fashion with said first liquid crystal layer;

a transparent electrode for generating a potential difference on said second liquid crystal layer in order to control an amount of phase difference for said light beam passing through said second liquid crystal layer; and a driver for driving said transparent electrode so as to generate a potential difference that is the lowest among a plurality of potential differences that cause an area of said second liquid crystal layer which includes at least an effective diameter of the light beam to function as an $n\lambda/4$ plate.

wherein said angle is in a direction that cancels a pretilt angle of said first liquid crystal layer.

12. The liquid crystal optical element according to claim 11, wherein the angle that a rubbing direction of said first liquid crystal layer makes with a rubbing direction of said second liquid crystal layer is approximately 45 degrees.

13. The liquid crystal optical element according to claim 12, wherein said liquid crystal optical element is tilted in a direction that matches the rubbing direction of said first liquid crystal layer.

14. The liquid crystal optical element according to claim 11, wherein said first liquid crystal layer corrects coma, spherical aberration, or astigmatism.

15. The liquid crystal optical element according to claim 11, wherein said first liquid crystal layer and said second liquid crystal layer are provided alternately between three transparent substrates.

16. A liquid crystal optical element disposed at an angle relative to an optical axis of a light beam, comprising:

a first liquid crystal layer for correcting aberration;

a vertically aligned second liquid crystal layer functioning as an $n\lambda/4$ plate and combined in an integral fashion with said first liquid crystal layer;

a transparent electrode for generating a potential difference on said second liquid crystal layer in order to control an amount of phase difference for said light beam passing through said second liquid crystal layer; and a driver for driving said transparent electrode so as to generate a potential difference corresponding to the amount of phase difference that achieves the lowest order n among a plurality of amounts of phase difference that cause an area of said second liquid crystal layer which includes at least an effective diameter of the light beam to function as an $n\lambda/4$ plate, wherein said angle is in a direction that cancels a pretilt angle of said first liquid crystal layer.

17. The liquid crystal optical element according to claim 16, wherein the angle that a rubbing direction of said first liquid crystal layer makes with a rubbing direction of said second liquid crystal layer is approximately 45 degrees.

18. The liquid crystal optical element according to claim 17, wherein said liquid crystal optical element is tilted in a direction that matches the rubbing direction of said first liquid crystal layer.

19. The liquid crystal optical element according to claim 16, wherein said first liquid crystal layer corrects coma, spherical aberration, or astigmatism.

20. The liquid crystal optical element according to claim 16, wherein said first liquid crystal layer and said second liquid crystal layer are provided alternately between three transparent substrates.

* * * * *